(12) United States Patent
Koperda et al.

(10) Patent No.: US 6,983,327 B2
(45) Date of Patent: *Jan. 3, 2006

(54) SYSTEM AND METHOD FOR PROVIDING STATISTICS FOR FLEXIBLE BILLING IN A CABLE ENVIRONMENT

(75) Inventors: Francis R. Koperda, Suwanee, GA (US); John R. Mann, III, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 20 days.

This patent is subject to a terminal disclaimer.

(21) Appl. No.: 10/625,147

(22) Filed: Jul. 23, 2003

(65) Prior Publication Data

US 2004/0107284 A1 Jun. 3, 2004

Related U.S. Application Data

(63) Continuation of application No. 09/588,211, filed on Jun. 6, 2000, which is a continuation of application No. 08/818,037, filed on Mar. 14, 1997, now Pat. No. 6,230,203, which is a continuation-in-part of application No. 08/732,668, filed on Oct. 16, 1996, now Pat. No. 5,966,163, and a continuation-in-part of application No. 08/627,062, filed on Apr. 3, 1996, now Pat. No. 5,790,806.

(51) Int. Cl.
*G06F 15/16* (2006.01)
*G06F 15/173* (2006.01)
*H04L 12/66* (2006.01)

(52) U.S. Cl. .................. 709/229; 709/224; 370/463

(58) Field of Classification Search ............... 709/224, 709/229; 455/3.1, 4.2, 5.1, 6.3; 370/463, 370/477; 725/105
See application file for complete search history.

(56) References Cited

U.S. PATENT DOCUMENTS

| | | | |
|---|---|---|---|
| 3,985,962 A | 10/1976 | Jones et al. | |
| 4,186,380 A | 1/1980 | Edwin et al. | |
| 4,207,431 A | 6/1980 | McVoy | |
| 4,361,851 A | 11/1982 | Asip et al. | |
| 4,475,123 A | 10/1984 | Dumbauld et al. | |
| 4,491,983 A | 1/1985 | Pinnow et al. | |

(Continued)

FOREIGN PATENT DOCUMENTS

DE  002716319 A1  8/1995

OTHER PUBLICATIONS

Data-Over-Cable Service Interface Specifications; Radio Frequency Interface Specifications; SP-RFI-I04-980724; Cable Television Laboratories, Inc.; 1997; pp 1-196.

(Continued)

*Primary Examiner*—Jason D Cardone

(57) ABSTRACT

A system for providing flexible billing in a cable environment can establish billing practices based on tier level of service, quality of service or the amount of network resources consumed. A plurality of tiers or levels of service can be defined by parameters including at least a maximum or peak bit rate or bandwidth for providing services over a shared channel. A plurality of levels or tiers of services are defined by maximum bandwidth or bit rate and a subscriber receives service at that subscribe-to level or at a slower data rate depending on availability of shared bandwidth. Quality of service is maintaining the specified bandwidth, jitter or delay. The amount of network resources consumed may be expressed in terms of the amount of data transmitted or the connect time of a network access device to the network.

28 Claims, 14 Drawing Sheets

U.S. PATENT DOCUMENTS

| | | |
|---|---|---|
| 4,528,589 A | 7/1985 | Block et al. |
| 4,536,791 A | 8/1985 | Campbell et al. |
| 4,577,224 A | 3/1986 | Ost |
| 4,601,028 A | 7/1986 | Huffman et al. |
| 4,633,462 A | 12/1986 | Stifle et al. |
| 4,641,304 A | 2/1987 | Raychaudhuri |
| 4,672,533 A | 6/1987 | Noble et al. |
| 4,757,460 A | 7/1988 | Bione et al. |
| 4,771,391 A | 9/1988 | Blasbalg |
| 4,804,248 A | 2/1989 | Bhagavatula |
| 4,823,386 A | 4/1989 | Dumbauld et al. |
| 4,858,224 A | 8/1989 | Nakano et al. |
| 4,907,224 A | 3/1990 | Scoles et al. |
| 4,912,721 A | 3/1990 | Pidgeon, Jr. et al. |
| 4,980,886 A | 12/1990 | Bernstein |
| 5,012,469 A | 4/1991 | Sardana |
| 5,014,125 A | 5/1991 | Pocock et al. |
| 5,047,928 A | 9/1991 | Wiedemer |
| 5,050,213 A | 9/1991 | Shear |
| 5,113,499 A | 5/1992 | Ankney et al. |
| 5,131,041 A | 7/1992 | Brunner et al. |
| 5,136,690 A | 8/1992 | Becker et al. |
| 5,142,690 A | 8/1992 | McMullan, Jr. et al. |
| 5,155,590 A | 10/1992 | Beyers, II et al. |
| 5,157,657 A | 10/1992 | Potter et al. |
| 5,159,592 A | 10/1992 | Perkins |
| 5,166,930 A | 11/1992 | Braff et al. |
| 5,166,931 A | 11/1992 | Riddle |
| 5,181,107 A | 1/1993 | Rhoades |
| 5,185,860 A | 2/1993 | Wu |
| 5,195,092 A | 3/1993 | Wilson et al. |
| 5,197,094 A | 3/1993 | Tillery et al. |
| 5,208,665 A | 5/1993 | McCalley et al. |
| 5,214,390 A | 5/1993 | Montreuil |
| 5,226,120 A | 7/1993 | Brown et al. |
| 5,235,619 A | 8/1993 | Beyers, II et al. |
| 5,239,540 A | 8/1993 | Rovira et al. |
| 5,251,324 A | 10/1993 | McMullan, Jr. |
| 5,261,044 A | 11/1993 | Dev et al. |
| 5,271,041 A | 12/1993 | Montreuil |
| 5,276,789 A | 1/1994 | Besaw et al. |
| 5,278,833 A | 1/1994 | Crisler et al. |
| 5,287,351 A | 2/1994 | Wall, Jr. |
| 5,295,140 A | 3/1994 | Crisler et al. |
| 5,295,244 A | 3/1994 | Dev et al. |
| 5,303,234 A | 4/1994 | Kou |
| 5,327,554 A | 7/1994 | Palazzi, III et al. |
| 5,333,183 A | 7/1994 | Herbert |
| 5,347,304 A | 9/1994 | Moura et al. |
| 5,361,259 A | 11/1994 | Hunt et al. |
| 5,384,777 A | 1/1995 | Ahmadi et al. |
| 5,390,181 A | 2/1995 | Campbell et al. |
| 5,404,505 A | 4/1995 | Levinson |
| 5,423,003 A | 6/1995 | Berteau |
| 5,423,006 A | 6/1995 | Brown et al. |
| 5,436,909 A | 7/1995 | Dev et al. |
| 5,440,555 A | 8/1995 | Momona |
| 5,471,399 A | 11/1995 | Tanaka et al. |
| 5,473,599 A | 12/1995 | Li et al. |
| 5,481,542 A | 1/1996 | Logston et al. |
| 5,483,631 A | 1/1996 | Nagai et al. |
| 5,504,921 A | 4/1996 | Dev et al. |
| 5,515,361 A | 5/1996 | Li et al. |
| 5,515,418 A | 5/1996 | Yamaguchi et al. |
| 5,517,488 A | 5/1996 | Miyazaki et al. |
| 5,517,502 A | 5/1996 | Bestler et al. |
| 5,517,618 A | 5/1996 | Wada et al. |
| 5,521,925 A | 5/1996 | Merakos et al. |
| 5,533,108 A | 7/1996 | Harris et al. |
| 5,534,913 A | 7/1996 | Majeti et al. |
| 5,535,206 A | 7/1996 | Bestler et al. |
| 5,535,403 A | 7/1996 | Li et al. |
| 5,553,095 A | 9/1996 | Engdahl et al. |
| 5,553,287 A | 9/1996 | Bailey et al. |
| 5,572,640 A | 11/1996 | Schettler |
| 5,586,121 A | 12/1996 | Moura et al. |
| 5,594,798 A | 1/1997 | Cox et al. |
| 5,604,528 A | 2/1997 | Edwards et al. |
| 5,608,446 A | 3/1997 | Carr et al. |
| 5,610,910 A | 3/1997 | Focsaneanu et al. |
| 5,612,959 A | 3/1997 | Takase et al. |
| 5,644,706 A | 7/1997 | Ruigrok et al. |
| 5,650,994 A | 7/1997 | Daley |
| 5,654,746 A | 8/1997 | McMullan, Jr. et al. |
| 5,675,732 A | 10/1997 | Majeti et al. |
| 5,701,465 A | 12/1997 | Baugher et al. |
| 5,703,795 A | 12/1997 | Mankovitz |
| 5,706,277 A | 1/1998 | Klink |
| 5,708,655 A | 1/1998 | Toth et al. |
| 5,708,961 A | 1/1998 | Hylton et al. |
| 5,710,884 A | 1/1998 | Dedrick |
| 5,712,897 A | 1/1998 | Ortel |
| 5,720,025 A | 2/1998 | Wilkes et al. |
| 5,721,780 A | 2/1998 | Ensor et al. |
| 5,724,492 A | 3/1998 | Matthews, III et al. |
| 5,729,682 A | 3/1998 | Marquis et al. |
| 5,737,311 A | 4/1998 | Wyld |
| 5,737,316 A | 4/1998 | Lee |
| 5,751,706 A | 5/1998 | Land et al. |
| 5,751,707 A | 5/1998 | Voit et al. |
| 5,751,971 A | 5/1998 | Dobbins et al. |
| 5,761,602 A | 6/1998 | Wagner et al. |
| 5,768,280 A | 6/1998 | Way |
| 5,790,548 A | 8/1998 | Sistanizadeh et al. |
| 5,790,806 A | 8/1998 | Koperda |
| 5,793,753 A | 8/1998 | Hershey et al. |
| 5,796,718 A | 8/1998 | Caterisano |
| 5,799,002 A | 8/1998 | Krishnan |
| 5,799,016 A | 8/1998 | Onweller |
| 5,805,591 A | 9/1998 | Naboulsi et al. |
| 5,805,596 A | 9/1998 | Kranzler et al. |
| 5,808,671 A | 9/1998 | Maycock et al. |
| 5,808,886 A | 9/1998 | Suzuki |
| 5,812,819 A | 9/1998 | Rodwin et al. |
| 5,818,845 A | 10/1998 | Moura et al. |
| 5,822,319 A | 10/1998 | Nagami et al. |
| 5,828,655 A | 10/1998 | Moura et al. |
| 5,828,666 A | 10/1998 | Focsaneanu et al. |
| 5,835,696 A | 11/1998 | Hess |
| 5,835,725 A | 11/1998 | Chiang et al. |
| 5,841,468 A | 11/1998 | Wright |
| 5,845,091 A | 12/1998 | Dunne et al. |
| 5,850,265 A * | 12/1998 | Suh .......................... 725/110 |
| 5,859,852 A | 1/1999 | Moura et al. |
| 5,881,234 A | 3/1999 | Schwob |
| 5,881,243 A | 3/1999 | Zaumen et al. |
| 5,884,024 A | 3/1999 | Lim et al. |
| 5,884,284 A | 3/1999 | Peters et al. |
| 5,892,812 A | 4/1999 | Pester, III |
| 5,894,479 A | 4/1999 | Mohammed |
| 5,898,780 A | 4/1999 | Liu et al. ....................... 380/25 |
| 5,903,572 A | 5/1999 | Wright et al. |
| 5,905,714 A | 5/1999 | Havansi |
| 5,905,736 A | 5/1999 | Ronen et al. |
| 5,956,391 A | 9/1999 | Melen et al. |
| 5,959,972 A | 9/1999 | Hamami |
| 5,966,163 A | 10/1999 | Lin et al. |
| 5,970,477 A * | 10/1999 | Roden .......................... 705/32 |
| 5,999,970 A | 12/1999 | Krisbergh et al. |
| 6,018,767 A | 1/2000 | Fijolek et al. |
| 6,028,860 A | 2/2000 | Laubach et al. |
| 6,032,266 A | 2/2000 | Ichinohe et al. |
| 6,049,826 A | 4/2000 | Beser |
| 6,052,819 A | 4/2000 | Barker et al. |

| | | |
|---|---|---|
| 6,055,224 A | 4/2000 | King |
| 6,058,421 A | 5/2000 | Fijolek et al. |
| 6,065,049 A | 5/2000 | Beser et al. |
| 6,070,246 A | 5/2000 | Beser |
| 6,073,178 A | 6/2000 | Wong et al. |
| 6,178,455 B1 | 1/2001 | Schutte et al. |
| 6,208,656 B1 | 3/2001 | Hrastar et al. |
| 6,230,203 B1 | 5/2001 | Koperda et al. |
| 6,249,523 B1 | 6/2001 | Hrastar et al. |
| 6,252,951 B1 * | 6/2001 | Alcott et al. ........... 379/114.03 |
| 6,272,150 B1 | 8/2001 | Hrastar et al. |
| 6,282,208 B1 | 8/2001 | Bowcutt et al. |
| 6,285,748 B1 * | 9/2001 | Lewis ................... 379/112.01 |
| 6,286,058 B1 | 9/2001 | Hrastar et al. |
| 6,295,298 B1 | 9/2001 | Hrastar et al. |

OTHER PUBLICATIONS

Data-Over Cable Service Interface Specifications; Cable Modem to Customer Premise Equipment Interface Specification; SP-CMCI-I02-980317; 1988; Cable Television Laboratories, Inc.; pps. 1-40.

Data-Over Cable Service Interface Specifications; Cable Modem Telephony Return Interface Specification; SP-CMTRI-I01-970804; 1997; Cable Television Laboratories, Inc.; pps. 1-74.

Data-Over Cable Service Interface Specifications; Radio Frequency Interface Specification; SPRFIv1.1-I01-990311; 1999; Cable Television Laboratories, Inc.; pps. 1-310.

Data-Over Cable Technical Reports; Operations Support System Framework for Data Over Cable Services; TR-DOCS-OSSIW08-961016; 1996; MCNS Holdings, LP; pps. 1-20.

Data-Over Cable Service Interface Specifications; Operations Support System Interface Specifications; SP-OSSI-I02-990113; 1999; Cable Television Laboratories, Inc.; pps. 1-26.

Data-Over Cable Service Interface Specifications; Operations Support System Interface Specification Radio Frequency Interface; SP-OSSI-RFI-I03-990113; 1999; Cable Television Laboratories, Inc.; pps. 1-29.

Data-Over Cable Service Interface Specifications; Operations Support System Interface Specification Baseline Privacy Interface MIB; SP-OSSI-BPI-I01-980331; 1998; pps. 1-33.

Radio Frequency (RF) Interface Management Information Base for MCNS Compliant RF Interfaces draft-ietf-ipcdn-rf-interface-mib-04.txt; May 22, 1998; Guenter Roeck (editor); pps. 1-55.

Cable Device Management Information Base for MCNS Complaint Cable Modems and Cable Modem Termination Systems draft-ietf-ipcdn-cable-device-mib-04.txt; May 22, 1998; Guenter Roeck (editor); pps. 1-32.

Baseline Privacy Interface Management Information Base for MCNS Compliant Cable Modems and Cable Modem Termination Systems; R. Woundy; Jan. 17, 1999; pps. 1-35.

Logical IP Subnetworks over IEEE 802.14 Services; Mark Laubach; Mar. 13, 1998; pps. 1-13.

A Distribute Queueing Random Access Protocol for a Broadcast Channel; Wenxin Xu and Graham Campbell; Illinois Institute of Technology (Comp. Science Dept.); pps. 1-9.

CBR Channels on a DQRAP-based HFC Network; Chien-Ting Wu, Graham Campbell; Illinois Institute of Technology (Comp. Science Dept); pps. 1-14.

Interleaved DQRAP with Global TQ; Chien-Ting Wu, Graham Campbell; Illinois Institute of Technology (Comp. Science Dept.); pps 1-27.

The Extended DQRAP (XDQRAP) Algorithm; Chien-Ting Wu, Graham Campbell; Illinois Institute of Technology (Comp. Science Dept.); Dec. 9, 1994; pps. 1-4.

Extended DQRAP (XDQRAP) A Cable TV Protocol Functioning as a Distributed Switch; Chien-Ting Wu & Graham Campbell; Illinois Institute of Technology (Comp. Science Dept.); pps. 1-7.

A Review of Contention Resolution Algorithms for IEEE 802.14 Networks; Nada Glomie; Yves Saintillan, & David H. Su; National Institute of Standards and Technology; pps. 1-11.

A Review of Contention Resolution Algorithms for IEEE 802.14 Networks; Nada Glomie, Yves Saintillan, & David H. Su; National Institute of Standards and Technology; pps. 1-12.

On IEEE 802.14 Medium Access Control Protocol; Ying-Dar Lin; 1998; pps. 1-13.

On IEEE 802.14 Medium Access Control Protocol; Ying-Dar Lin; 1998; pps. 1-11.

On IEEE 802.14 Medium Access Control Protocol; Ying-Dar Lin; 1998; pps. 1-10.

Hybrid-Fiber Coax; Hung Nguyen and Felix Yao; Apr. 22, 1996; pps. 1-11.

Cable Data Modem Performance Evaluation, A Primer for Non-Technical Readers; Cable Television Laboratories, Inc.; Nov. 15, 1996; pps. 1-8.

High Speed Cable Modems, Including IEEE 802.14 Standards; Albert A. Azzam; Chapters 5, 6.

Cable Device Management Information Base for DOCSIS Compliant Cable Modems and Cable Modem Terminating Systems; Michael St. Johns; Mar. 30, 1999; pps. 1-54.

Radio Frequency (RF) Interfaces Management Information Base for MCNS/DOCSIS Compliant RF Interfaces; Mike St. Johns, (Editor); Feb. 17, 1999; pps. 1-67.

Telephony-Return Interface (TRI) Management Information Base for DOCSIS-compliant Telephony-Return Cable Modems and Cable Modem Termination Systems; S. Adiraju, J. Fijolek; Apr. 2, 1999; pps. 1-27.

Data Over Cable System Quality of Service Management Information Base (DOCSIS-QOS MIB); Mike Patrick; J. Harvey; Motorola ING; Jun. 25, 1999; pps. 1-43.

Docsis 1.1 IGMP MIB, H. Abramson, Motorola; Jun. 1999; pps. 1-13.

Publications and Technical Reports of Dolors Sala—Home Page; pps. 1-6.

Scheduling Disciplines for HFC Systems: What can we learn from ATM scheduling?; Dolors Sala, John O. Limb; GA Tech; pps. 1-6.

A Protocol for Efficient Transfer of Data over Fiber/Cable Systems; Dolors Sala, John O. Limb; GA Tech; pps. 1-8.

MAC Protocols for Multimedia Data over HFC Architecture; Dolors Sala Batlle; Oct. 27, 1995; pps. 1-28.

An Access Protocol to Support Multimedia Traffic Over Hybrid Fiber/Coax Systems; John O. Limb, Dolors Sala; pps. 1-6.

Simulation of the Performance of XDQRAP under a Range of Conditions; John O. Limb, Dolors Sala, Jason Collins, David Hartman, Daniel Howard; pps. 1-10.

Interleaved DQRAP with Global TQ; Chien-Ting Wu, Graham Campbell; Illinois Institute of Technology, CS Dept.; Jan. 8, 1995; pps. 1-26.

Data Link Protocols; Uyless Black; Bell Atlantic Education Services; PTR Prentice Hall; New Jersey; 1993; pps. 141-159.

ATM Foundation for Broadband Networks; vol. 1; Ed. 2; Uyless Black; Prentice Hall; NJ; 1999; pps. 260-299.

The V Series Recommendations; Ed. 2; Uyless Black; McGraw-Hill, Inc.; 1995; pps. 169-184.

Frame Relay Networks; Ed. 2; Uyless Black; McGraw-Hill, Inc.; 1996; pps. 159-176.

ISDN; Ed. 3; Gary C. Kessler & Peter V. Southwick; McGraw-Hill, Inc.; 1997; pps. 111-128.

ISDN & SS7: Architecture for Digital Signaling Networks; Uyless Black; Prentice Hall; NJ; 1997; pps. 31-47.

ISDN and Broadband ISDN with Frame Relay and ATM; Ed. 4; William Stallings; Prentice Hall; NJ; 1999; pps. 181-343; pps. 312-343.

Extended DQRAP (XDQRAP); Chien-Ting Wu; Graham Campbell; Illinois Institute of Technology (Comp. Sci. Dept.); Jan. 8, 1995; pps. 1-4.

Dynamic Host Configuration Protocol; R. Droms; Network Working Group Request for Comments; 1993; pps. 1-39.

Cisco Hot Standby Router Protocol (HSRP); T. Li, et al.; Network Working Group Request for Comments; 1998; pps. 1-17.

Address Allocation for Private Internets; Y. Rekhter, et al.; Network Working Group Request for Comments; 1994; pps. 1-8.

Network 10 Considered Harmful (Some Practices Shouldn't be Codified); E. Lear, et al; Network Working Group Request for Comments; 1994; pps. 1-8.

Unique Addresses are Good; E. Gerich; Network Working Group Request for Comments; 1995; pps. 1-3.

Address Allocation for Private Internets; Y. Rekhter, et al.; Network Working Group Request for Comments; 1996; pps. 1-9.

The IP Network Address Translator (NAT); E. Egevang, et al.; Network Working Group Request for Comments; 1994; pps. 1-10.

IP Network Address Translator (NAT) Terminology and Considerations; P. Srisuresh, et al.; Network Working Group Request for Comments; 1999; pps. 1-24.

Load Sharing Using IP Network Address Translation (LSNAT); P. Srisuresh, et al.; Network Working Group Request for Comments; 1998; pps. 1-18.

DNS Extensions to Network Address Translators (DNS_ALG); P. Srisuresh, et al.; Network Working Group Request for Comments; 1999; pps. 1-29.

Security Model with Tunnel-Mode IPsec for NAT Domains; P. Srisuresh, et al.; Network Working Group Request for Comments; 1999, pps. 1-11.

Network Address Translation—Protocol Translation (NAT-PT); G. Tsirtsis, et al.; Network Working Group Request for Comments; 2000; pps. 1-21.

Stateless IP/ICMP Translation Algorithm (SIIT); E. Nordmark; Network Working Group Request for Comments; 2000; pps. 1-26.

FTP Extensions for IPv.6 and NATs; M. Allman, et al.; Network Working Group Request for Comments; 1998; pps. 1-8.

PPP Bridging Control Protocol (BCP); F. Baker et al.; Network Working Group Request for Comments, Jun. 1994; pps. 1-28.

TCP/IP Illustrated, vol. 1—The Protocols; W. Richard Stevens; Addison-Wesley Longman, Inc.; Jan. 1999; Chapters 1, 2, 3, 4, 9, 10, 11, 16, 25.

* cited by examiner

SYSTEM AND METHOD FOR PROVIDING STATISTICS FOR FLEXIBLE BILLING IN A CABLE ENVIRONMENT

This application is a continuation application of U.S. patent application Ser. No. 09/588,211 filed Jun. 6, 2000, which was a continuation application of U.S. patent application Ser. No. 08/818,037 filed Mar. 14, 1997, now issued as U.S. Pat. No. 6,230,203, which was a continuation-in-part of U.S. patent application Ser. No. 08/627,062 filed Apr. 3, 1996, now issued as U.S. Pat. No. 5,790,806, and U.S. patent application Ser. No. 08/732,668 filed Oct. 16, 1996, now issued as U.S. Pat. No. 5,966,163.

BACKGROUND OF THE INVENTION

1. Technical Field

This invention relates to the field of collecting useful data for billing telecommunications service subscribers and, more particularly, to a system and method for administering multiple tiers or levels of services to subscribers demanding greater flexibility in bandwidth or bit rate of services provided them, particularly digital data services.

2. Description of the Related Arts

A problem we examined is the problem of providing multiple tiers or levels of service in a new combined telecommunications/cable television environment. The problem is introduced in parent U.S. patent application Ser. No. 08/627,062 entitled: Cable Data Network Architecture" of Francis R. Koperda filed Apr. 3, 1996 and a solution described but not claimed in that application. Now, subscribers to telephone services or cable services are faced with a number of alternative choices of service. They can purchase movies on demand or download them for later viewing at their leisure, listen to digital audio programming, play games locally or interactively, protect their home via burglar or fire alarms services, purchase products and services through home shopping, bank from their homes, attend school from their homes, work from their homes, subscribe to energy management with their gas, electric or other utility company, video or audio conference with other subscribers to their network or a connecting network, access new game or utility software, access web sites on the Internet to download information, data or applications software and the like in addition to subscribing to basic telephone and cable, basic or pay, services. The digital data service world is virtually unlimited.

It was previously known in the cable television arts for a subscriber to pick, for example, a tier or level of service, that represented that subscriber's interests from one of several categories based on their interest level, premium service level or the like or combinations of these factors. For example, a cable television service subscriber may subscribe to a sports tier comprising the several premium sports television channels, a movie tier comprising several of the premium movie channels and also receive a basic service level. The subscriber also subscribed to adjunct services separately such as telecommunications, energy management, digital audio or game services. These adjunct services are billed in different manners depending on the service, for example, a game service based on play time or billing by the game or a telecommunications call based on whether the call is local or long distance.

The challenge we faced is to represent a service tier or performance tier looking at the types of services that are presently available or available in the near future in combination over the same facilities such as Internet, telecommunications, video conferencing and the like services. We postulated that the service provider determine a maximum amount of bandwidth or bit rate and guarantee service delivery at the level of service by measuring various parameters. Some of the parameters we considered included access time, delivery duration, program length or size, maximum error rate, peak bit rate or bandwidth, connect time, data route delay, jitter, etc.

For example, when subscribing to a digital program delivery service, a subscriber may expect or even demand, that a three megabyte digital data program be downloaded to them within x seconds for play, transfer to an audio or video recorder or transfer to a personal computer or game player. In a video conference with other subscribers, the participating subscribers may demand a quality of resolution in the picture signal color, refresh rate and quality of sound that can be best represented in terms of the serving signal's bandwidth.

In the field of digital data services, the service provider providing services in a cable environment may be constrained by the developer of the digital data service and by the subscriber to the digital data service. For example, in a digital game delivery service where two players of the same game are remotely located and play through a cable network, the service provider may be constrained by the developer of the game as to game size and speed of play and the requirements, capabilities and capacities of each player's game-playing apparatus. In particular, the boundaries that the service provider sets can influence and determine the players' quality of interactive play. Of particular importance, again, is the bandwidth of the channel upstream and downstream to each player, the bit error rate or data lost in transmission and the round-trip delay between players among other constraints. The service provider may not be able to improve the efficiency of the use of a delivered or accessed game program because 1) the features and size of the program are determined by the game program provider and 2) if the program is downloaded, the quality of play may be limited by the subscriber owned equipment that the subscriber plays or uses the program on.

Yet, the game player subscribers can criticize the cable network owner for 1) delivering the program to them with errors 2) delivering the program after an expected delivery time or with unexpected delay and 3) delivering the program over too long a duration (probably not enough bandwidth).

We generalized beyond specific services such as game services. Services today are becoming more and more digital in nature. Many different protocols are employed for providing such digital data services. Many, if not all, are peak bandwidth and delay or jitter dependent. These digital services can be characterized as ABR (available bit rate), CBR (continuous bit rate), UBR (uncommitted bit rate) and VBR (variable bit rate), among others. A constant bit rate transport is described in parent U.S. patent application Ser. No. 08/738,668 entitled "Constant Bit Rate Transport in a Contention Based Medium Access Control" of Koperda et al. These various digital service delivery means suggest different parametric data requirements which typically proved to involve at least peak bandwidth and delay or jitter, as will be further defined herein.

If interactivity is required for providing a digital or analog service, connect time can tie up a network. Telecommunications carriers are now complaining that connect time to the Internet is tying up their networks. Subscribers are not able to connect to homes of Internet users who use their one line for Internet service and, yet, are unwilling to subscribe to call waiting, telephone answering or voice mail services.

Meanwhile, local "free" calls tie up central office facilities including valuable trunk facilities between telephone central offices. These trunks were provisioned before the days of the Internet when the average telephone call lasted well under three minutes. (The average Internet call may involve a connect time of hours, not minutes). Thus, there remains a need in the art to provide a shared telecommunications channel between the subscriber and the location of the service provider that can periodically provide the peak bandwidth, when the subscriber requests, of dedicated or shared with others use.

Now, if we define digital data services in such terms as bandwidth, bit rate, error rate, connect time, delivery time, delay, jitter and the like, there exists in the first instance little or no known apparatus in existing networks to 1) detect the parameters comprising such a level of service, 2) relate any detected parameter levels to particular subscribers and their subscribed to level of service, 3) police or regulate the network to assure that the subscribed to level of service is met 4) provide for provisioning of future equipment to meet demand for digital data service or 5) permit flexible billing based on tier or level of service that is peak bandwidth related.

To some extent it is known to bill at different rates depending, for example, on data transfer rate. In the past, telecommunications service providers provided basic telephone service over a dedicated copper wire pair, conditioned with load coils, to guarantee dedicated bandwidth of approximately three kilohertz. To provide services beyond basic service, the telecommunications service providers have billed for private line, specially conditioned, data services (load coils are removed from the copper pair and amplifiers and equalizers added to support greater bandwidth and guarantee maximum noise levels). However, these specially conditioned lines were not shared or regulated for other lower or higher bit rate or bandwidth demanding services for provision to the same or other subscribers. The copper pair was dedicated to the subscriber, at least between their home and a serving telephone central office.

U.S. Pat. No. 5,533,108 (see FIG. 6A) describes billing for different services at different prices based on data rate. Other patents of interest include U.S. Pat. No. 5,404,505 (rate based on database size); U.S. Pat. Nos. 5,166,930; 5,050,213; 4,823,386; 4,804,248; 4,577,224; 4,536,791; 4,475,123; 4,491,983 and 4,361,851.

For the purposes of the present application then, level of service shall be defined as representing a digital data or analog service having at least a specified peak bandwidth or bit rate and a specified data route delay or jitter and optionally a bit error rate provided over a channel between the subscriber and the service provider that is shared by at least two subscribers. Variables that may be used to guarantee the subscribed-to level of service is met are delay, jitter, access time, response time, connect time, delivery rate, error rate, lost data, database or program size and the like. In addition, traditional level of service variables may be regarded as well such as parental guidance rating for particular program data which may be specific to an identified subscriber household member.

In order to provide such a concept of level of service, it is required in the art to provide a system and method of detecting service parameters, identifying the detected parameters to a particular subscriber and policing those parameters throughout the network to assure a level of service as defined above is being met.

SUMMARY OF THE INVENTION

An administration system according to the present invention allows a tiered level of service for analog or digital services having parameters including at least a specified peak bandwidth or bit rate and, optionally, a specified bit error rate and a route delay or jitter on a channel that is shared by at least two subscribers, at least between the subscriber and the service provider. A network control computer is coupled with a link access controller and a plurality of detectors for detecting and measuring the parameters, for example, for delivering a variety of services via a network access device coupled with equipment at the subscriber's premises such as a cable modem. A link access controller detects and reports data representing level of service parameters. The link access controller collects and reports statistics for level of service verification such as delay, jitter, time of day, connect time, data error rate, bandwidth or bit rate, data throughput, lost or discarded data, absolute delay, access time and the like for upstream data channels provided in response to source network access device requests. The link access controller polices and assures a subscribed-to level of service is met. In particular, the link access controller monitors the amount of data flowing from the network access device upstream and the connect time of each connected network access device. The link access controller also regulates the flow of upstream traffic by monitoring for excess bursts of data on the shared channels to the subscribers that it cannot handle and so must discard it. It grants the network access device the right to transmit a certain amount of data at a selected data rate at a particular point in time so that all network access devices coupled to it have an opportunity to obtain service and thus monitors the quality of service provided the subscriber.

The network control computer is also coupled with an administration computer for maintaining and updating level of service data for particular subscribers. The network control computer records level of service statistical data collected from the link access controller and forwards collected data to the administration controller.

A method of providing a level of service including at least a specified peak bandwidth or bit rate and insured by monitoring bit error rate and route delay or jitter over a shared channel comprises the steps of collecting subscribed to level of service data from an administration controller, collecting level of service parametric data from a plurality of detectors including service access devices (such as cable modems), associating the level of service parametric data from the detectors with the subscribed to level of service and policing the level of service by adjusting network parameters. A tier or level of service is determined by a maximum bandwidth or bit rate and insured by monitoring statistics of actual data throughput and session duration. When service is requested, the method involves the steps of receiving a service request for a peak bit rate or bandwidth and further including the subscriber's unique identity (network access device), retrieving the subscribed to level of service, comparing the requested bit rate with the subscribed to level of service and, if the requested peak bit rate is less than or equal to the bit rate representing the subscribed to level of service, initiating a routing of the communication.

These and other features of the present invention will be understood from studying the drawings and detailed description which follows.

DETAILED DESCRIPTION

Figure 1:
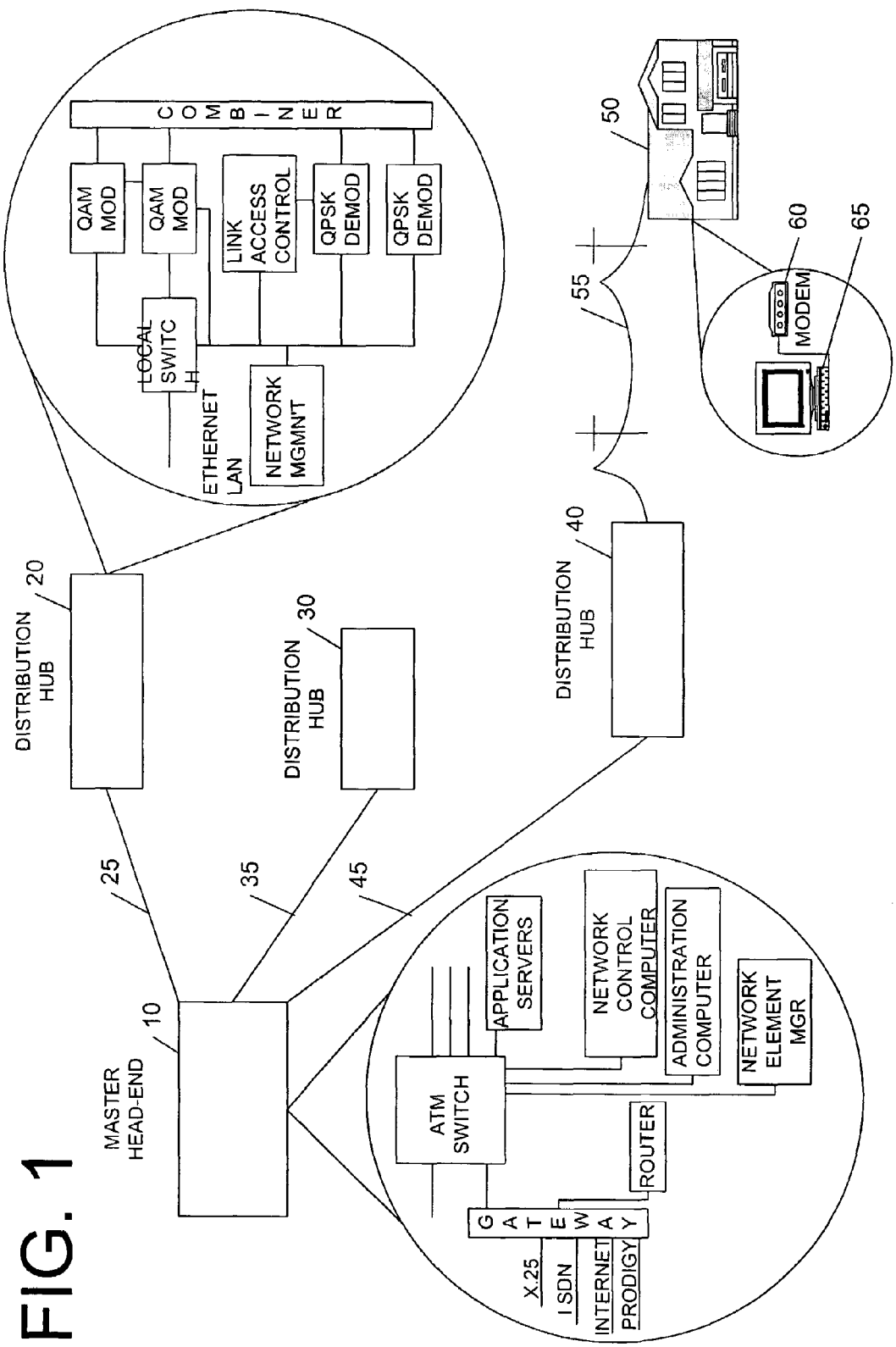
FIG. 1 is an overall diagram of a network topology according to the present invention for providing traditional telecommunications and cable television services as well as new digital data products and services.

Referring to FIG. 1, there is shown an overall diagram of a network topology in accordance with the present invention. In such a topology, it is expected that there will be interplay among the many network elements that perform the function of authorizing a tiered level of service as defined above for a subscriber. The maximum level of service for a particular subscriber may be limited, but the number and flexibility of providing a virtually unlimited number of tiers defined more by quality of service, than by subscriber preferences for, for example, digital data services such as digital CD-ROM applications, is a key feature of the present invention. Yet, parametric data related to the subscribed-to level of service may be maintained within the network and policed to ensure level of service criteria is met.

Some subscribers may require intermittent usage, for example, according to their time of day in their homes. Others may require full time access to Internet services and simultaneous opportunity to receive and make basic telephone calls or conduct video conferences. Other customers are demanding rapid access to information either for downloading a digital data program or for reviewing data collected in a sharable database. These customers will be expected to pay for the infrastructure of trunks, lines and bandwidth necessary to support their respective needs. Once access to a network is granted (described herein as a data grant), it may be necessary to intentionally limit the peak information transfer rate of one subscriber vis a vis another subscriber sharing the same high bandwidth channel from the subscriber location according to the present invention. In other words, a controller regulates the sharing of the large bandwidth channel accessed multiple subscribers at the same time to intentionally limit the peak information transfer rate or bandwidth to or from each subscriber. In addition since each connected subscriber may have different needs, other parametric data is collected for the subscriber sessions depending on the type of digital data service desired at a particular time (ABR, CBR, UBR, VBR, etc.).

Usage based billing pioneered by telecommunications companies is a new concept for cable companies. On the other hand, program based billing for services is a new concept for telecommunications service providers. What is new to both is the concept of providing both types of services over large bandwidth channels that are shared by subscribers for each of downstream and upstream directions respectively from or to a headend or central office (in the past, the initial point of connection of the subscriber with a service provider).

A master headend 10, (further described in FIG. 1A) which may be located at a telephone central office, includes a switch and a gateway for accessing multiple networks and services and for connecting subscribers together in various alternative ways, for example, audio telephone call, video conference, interactive game, Internet access and the like. The master headend, shown in detail as exploded from a box representing master headend 10, will be further described with reference to FIG. 1A. The master headend 10 is coupled with fit, second, third or more distribution hubs, 20, 30, 40 . . . and so on. A distribution hub, shown exploded from distribution hub 20, according to the present invention, is further described with reference to FIG. 2. The distribution hub 20 is the primary coupling point between a typically geographically dispersed group of subscribers and the master headend 10 of the present invention. The distribution hub may be coupled with the master headend 10 by fiber optic cable or high speed metropolitan area network (MAN) facilities 25, 35, 45. Such high capacity, shared bandwidth facilities provide a plurality of channels that can be shared among the subscribers coupled to the distribution hubs 20, 30, 40 . . .

Connecting a typical distribution hub 40 with the subscribers is a fiber optic, coaxial cable, or a hybrid fiber optic/coaxial (HFC) cable system 55 (for example, providing opportunities to a subscriber to access data channels of greater than 256 kbits/sec capacity). For example, one or more portions of the available radio frequency (RF) spectrum can be dedicated to each of upstream or downstream traffic but, within these shared portions, the allocation of bandwidth or bit rate is shared and controlled, according to the present invention, according to service levels or tiers authorized to uniquely identified network access devices in subscriber's premises. The network access device in the subscriber's premises connects to various subscriber provided apparatus. At a typical subscriber's premises or residence 50, there may be any number of types and quality of home apparatus that may be used to receive, store, play or otherwise take advantage of analog and digital data services and products offered via the network of FIG. 1. These may include, but are not limited to, audio music, software programs, game (individual or interactive), home shopping, energy management, video or audio conferencing, television programming, energy management, Internet or similar service access, alarm services, movies on demand, for recording and later play, database access generally, for example, subscriber or service directory and the like. There may be an interface to or direct access to the following types of equipment 65 via one or more network access devices 60 such as cable modulator/demodulators (cable modems): audio equipment, television equipment, personal or home or business computers, telephones, audio or video recorders, cable television terminals, game players, energy equipment, thermostats, burglar or fire alarm equipment, computer printers, facsimile machines, telephones, pagers, cellular phones, personal communicators and the like.

Generally, it may be summarized that administration and network control functions according to the present invention are located at the master headend 10. Broadband product and service delivery equipment is located at the distribution hub 20, 30, 40 . . . Finally, customer requesting service equipment including network access device 60 is preferably located at or near the subscriber's residence or premises 50. The cable data network architecture and flexible service tier billing apparatus according to the present invention will now be described with reference to the accompanying figures. The described network is embodied as an ATM network by way of example only and the present invention should not be construed to be limited to an AYM system.

Master Head-end (MHE)

The MHE contains the core control systems for the network. In the network architecture according to the present invention, the MHE may be located in a separate geographical location from multiple distribution hubs, or the MHE and distribution hubs may co-reside.

Figure 1A:
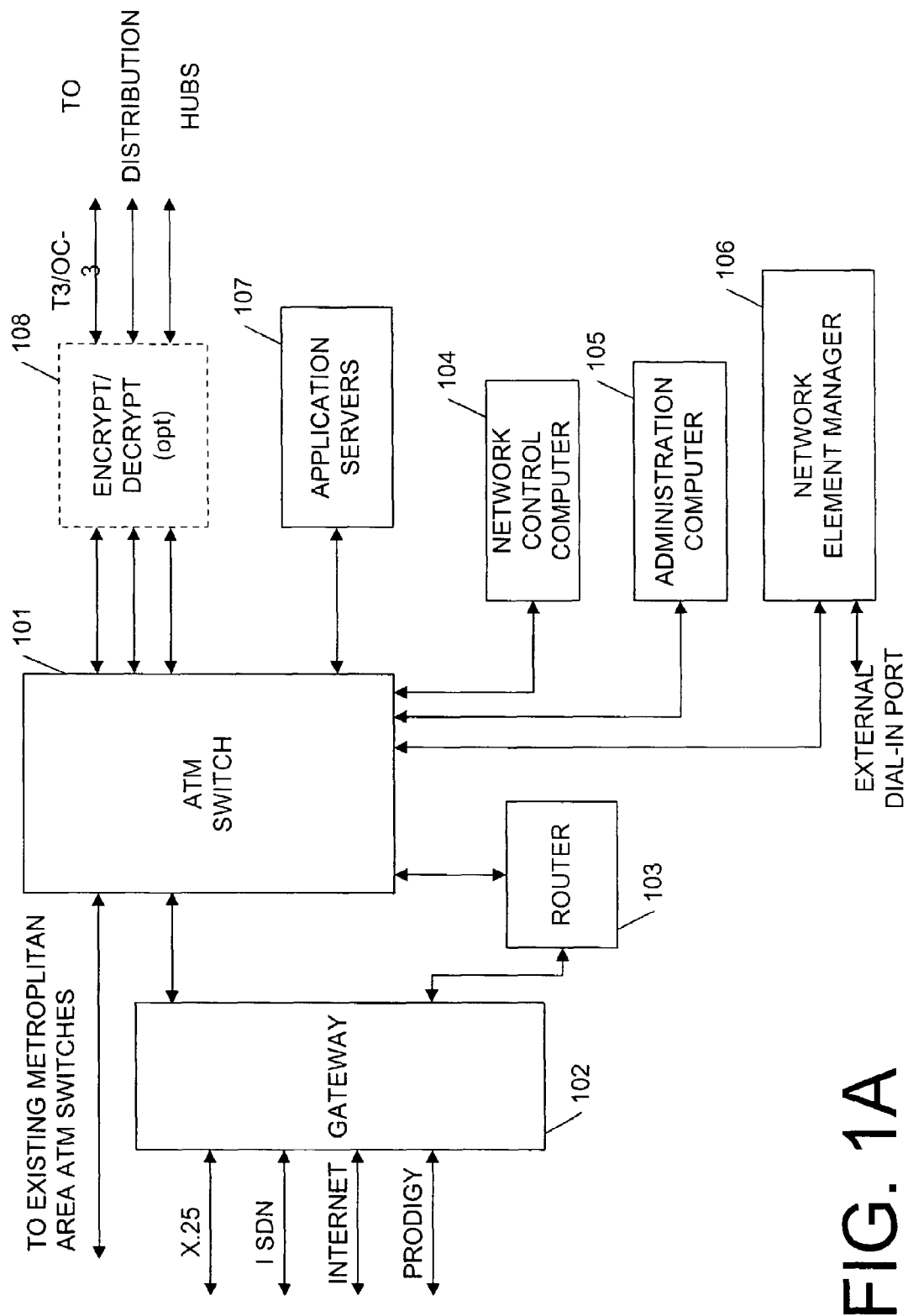
FIG. 1A provides a block diagram of a master head end of FIG. 1 for use in a cable data network according to the present invention.

With reference to FIG. 1A, the MHE may include an ATM switch 101, a gateway 102, a router 103, a network controller computer 104, an administration computer 105, a network element manager 106, application servers 107, and an optional encryption/decryption device 108.

Existing metropolitan or other asynchronous transfer mode (ATM) switches shown by way of example as ATM switch 101 moves digital data, for example, the ATM data packets (e.g., 48 bytes of data plus a 5 byte header) around the system based upon their address information. The ATM switch 101 sends a received ATM packet along the proper route. The switch 101 may also support switched virtual circuits (SVC) and quality of service (QOS) for each connection. To simplify the design, the switch 101 incorporates information about the downstream and upstream links in its route selection process and topography database (not shown) as is known in the art.

The gateway 102 maps ATM cells from the network over to a public switched telecommunications network into common protocols such as X.25, frame relay, TCP/IP or ISDN protocols. Services provided via gateway 102 include, but are not limited to, X.25 protocol services via link or links 121, integrated switched digital network (ISDN) services typically offered via telecommunications service providers via ISDN links or trunks 122, Internet services via Internet links 123 and related services such as Prodigy (shown) via links 124. Other links to other services are also contemplated but not shown.

The router 103 operates at a higher protocol level than the ATM switch 101. The switch 101 knows nothing about the contents of a message and looks only at the header to determine the address of the ATM cell. A router 103 needs to reassemble the ATM cells into IP packets and evaluate the contents of each IP packet. This additional functionality requires additional processing. During the set-up process at the gateway 102, if the destination cannot be reached by the switch 101, then the router 103 may be used to determine the destination of an IP packet and the destination may be reached by the router 103.

Figure 2:
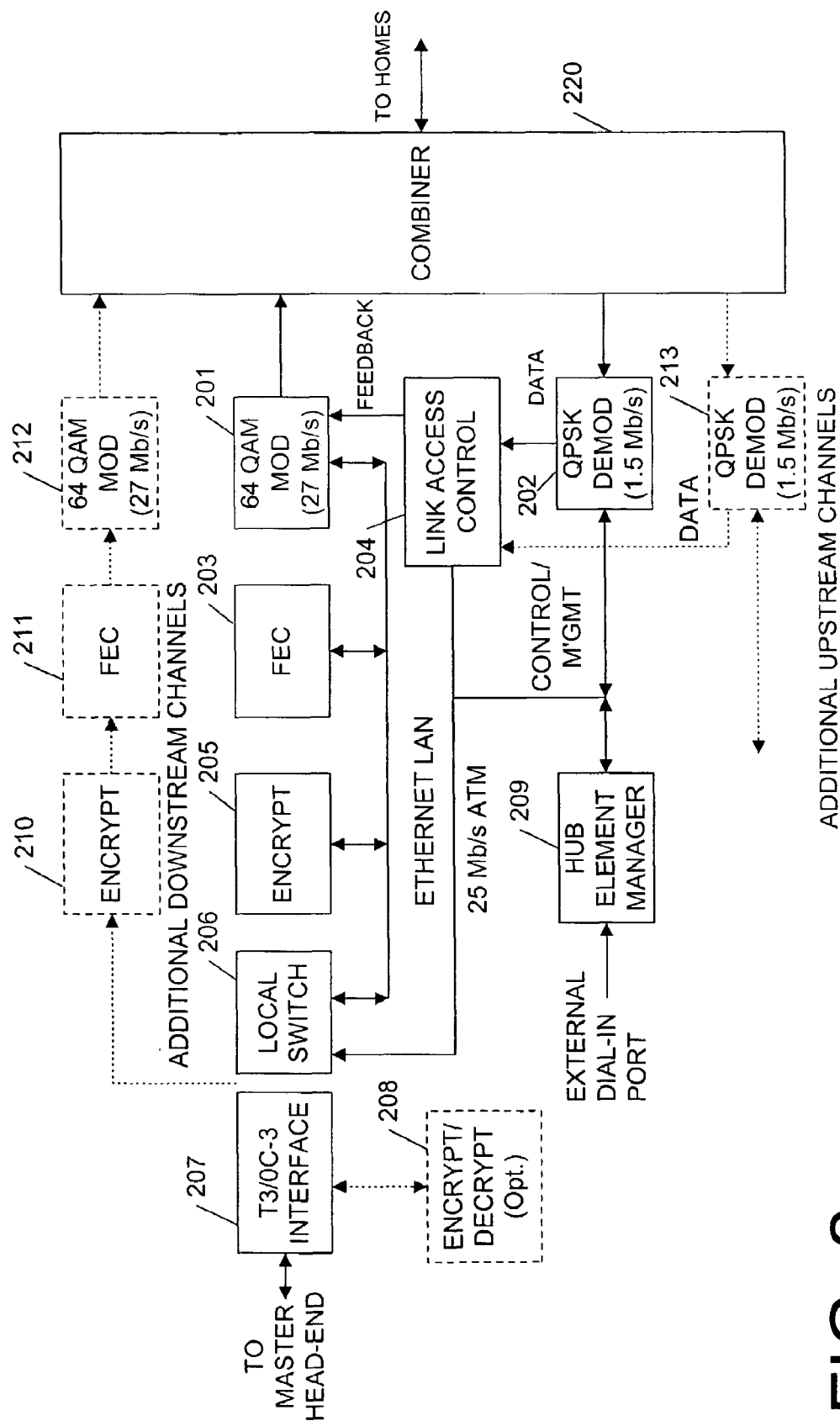
FIG. 2 provides a block diagram of a distribution hub for use in a cable data network according to the present invention.

Optional encryption/decryption device 108 enables bulk encryption of data transmitted to the distribution hubs and bulk decryption of data received from the distribution hubs (to be further discussed in reference to FIG. 2).

The administrative computer 105 of the present invention is a system used by operators of the network to control various functions such as billing for services provided, authorizing units, and service calls. The administrative computer extracts information from the system and responds to requests from other parts of the network. Each operator may use a customized system which is designed to be compatible with the network.

The administrative computer 105 performs such functions as authorization, billing, service level and connection statistics functions. It stores and maintains service level data for each subscriber and provides billing and usage data on command. It also permits authorization and deauthorization of subscribed to levels of service and may remotely communicate with other administration computers of other master headends as necessary. The authorization function may be implemented by providing each customer network access device, such as a cable modem, with a unique number, such that the network administrator will provide services selected by the corresponding user to the unique customer modem number.

The service level function served by the computer 105 limits each user to the service level selected and paid for by the user. For example, the network is capable of providing different services to each user at different data rates and in accordance with different protocols involving different parametric requirements. If the service provider wishes to charge based on the level of network performance such as bandwidth, types of data handled, or the amount of connectivity, the administrator provides this information along with the unit identifier to an authorization database within the administrative computer 105. Billing services may be implemented by obtaining information about which services are activated by the customer during the connection set-up process. Connection statistics services may be obtained from the link access control unit of each distribution hub (see FIG. 2, described below) which may maintain statistics about every connection traveling in the upstream direction. These statistics may include the amount of data transmitted, the length of the connection, the bandwidth of the connection, and/or the amount of data rejected and other parametric data. The link access controller as will be further described herein also corrects data that require correction via the forward error corrector. The parametric statistics may be presented to the administration computer 105 at the termination of each connection.

The network element manager 106 performs fault detection, system alarms, error reporting and alert functions for the administration computer 105 and network control computer 104. The network element manager does not detect errors itself, but rather monitors various error detection circuits within each link of the network to document the occurrence of transmission errors. An external dial-in port is provided to enable direct access to the information stored in the network element manager 106 such that access to this information may be obtained without relying on the cable data network itself if necessary.

The services and information desired by users of the network architecture according to the present invention may partially reside in application servers 107. These servers provide such services as navigators, banking, shopping and any other desired local information and services. Application servers 107 are shown as a single functional box but may represent different elements for different functions. A server is a connectible computer accessed for providing, for example, a special function or service or combination of related functions. An application server may, for example, provide Internet navigator software access, provide banking application access or home shopping application access with its attendant security and currency transfer ramifications.

The Network Control Computer (NCC) 104 assists in performing home device(s) (such as a cable modem) boot processes and performs route computation for routing communications to and through the gateway or between subscribers and provide directory services (subscriber and services database). In accordance with the present invention, the NCC 104 obtains service level information for subscribed-to services from an administration computer 105 and via the distribution hubs accesses link access controllers for assuring a subscribed to level of service is met.

The Network Control Computer (NCC) 104 performs three other functions: directory services, connection establishment and modem initialization. If there is a need to scale the performance of the NCC, the NCC may be divided into a plurality of computers, for example, three computers, each of which perform one of the three primary functions. In the alternative, numerous NCCs may operate in parallel.

The size of the NCC computer 104 is based on the required performance. For example, in one embodiment of the network architecture according to the present invention, the NCC 104 is capable of handling seven connection setups per second and seven directory service requests per second simultaneously over a sustained period of time. The NCC 104 may be attached to the ATM switch 101 via an ATM link using a network-to-network interface (NNI) over a permanent virtual connection (PVC) link.

A network access device initialization or boot process is briefly described for a cable modem. When a cable modem is connected to the network, it searches the downstream radio frequency (RF) channels of the network to determine which RF channel(s) contains information for the data network (in contrast to RF channels used for television, telephone, meter reading, and other services). Once the modem has identified its own upstream transmission channel, it then determines where on the upstream RF channel(s) to transmit and obtains information about the network from the MHE or its associated distribution hub.

In the cable data network according to the present invention, there are multiple receive and transmit channels through which data is transmitted to and from the home modem. And these may be shared with other subscribers, so a particular network access device needs to reserve space on an upstream channel. Therefore, the optimal data path through the network must be calculated based upon the bandwidth resource of the cable portion of the network. To perform this function, the NCC 104 receives information on the type and amount of bandwidth needed for a connection. If the authorized level of service for the requesting subscriber modem is not exceeded when the demanded bandwidth is compared with the authorized bandwidth, the NCC 104 then identifies a path through the cable by selecting the proper modulator and demodulators, ensures that the connection is allowed, and communicates with the respective ATM switch(es) 101 to complete the network route.

The directory service function of the NCC 104 involves mapping between various address types that may be used by various users on the network. Each of the protocols used in the network has its own name and address structure. A name may move to different addresses. Just as in telephone directory services, inquiries must be made to a specific address. The person or name may not be at that address, so the caller may need to try another address. The network environment includes a mixture of protocols, some of which have names and some of which have addresses. Several common name/address servers that may be included in the network are E.164 addressing (up to 20 byte fields similar to the standard telephone number); X.500 Name server (ANSI standard for distributed name server); 48 Bit IEEE address (6 byte address commonly found on LANs); 64 Bit IEEE address (extended address); IP addressing (device would become an IP domain name server).

The connection from the MHE 10 to the various hubs is via, for example, a fractional T3, a clear channel T3, or an OC-3. To the switch 101, this link appears to be another trunk because there are number of destination addresses located at each side. For simplicity, each monitor at the hub has a separate link back to the switch. As traffic characteristics change, a smaller switch may be inserted at the hub to handle local switching of the traffic and allow aggregation of multiple lower speed T3s to higher speed OC3s.

Distribution Hub

FIG. 2 provides a functional block diagram of a distribution hub for use in the cable data network architecture according to the present invention. The distribution hub includes a modulator 201, a demodulator 202, a forward error correction (FEC) circuit 203, a Link Access Control (LAC) circuit 204, an encryption circuit 205, a local switch 206, a T3/OC-3 interface 207, an optional encryption/decryption circuit 208, combiner 220, and a hub element manager 209. Encryption circuits 205 are required for data privacy, for example, for banking, shopping and other services requiring secure communication. Additional downstream channels may be added by including an additional modulator 212, FEC circuit 211, and encryption circuit 210 for each additional channel. Additional upstream channels may added by including an additional demodulator 213 for each additional channel.

Normally, all transmissions between the MHE and the distribution hub(s) are baseband transmissions involving no modulation/demodulation. The typical data rates for these transmissions may be, for example 45 mb per second (T3 channel), 155 mb per second (OC3 channel), or a larger channel such as an OC12, OC24, or OC48 channel enabling communication rates of several gigabytes per second. In the preferred embodiment of the present invention, the link(s) between the MHE and the distribution hub(s) are selected to include as few links as possible to accommodate the needs of the system. An interface 207 is provided in the distribution hub to enable transmission of data to and receipt of data from the MHE.

The optional encryption units 210 and 205 differ from the optional encryption/decryption unit 208 in that encryption/decryption unit 208 is used to bulk encrypt or decrypt data transmitted between the distribution hub and the MHE while encryption units 205 and 210 are used to individually encrypt data to be transmitted to individual users using a different encryption key from each user rather than bulk encryption.

With respect to the downstream transmission of data in the cable data network according to the present invention, the primary purpose of the distribution hub is to translate a relatively large stream of data received from the MHE into multiple smaller (e.g., 27 mb) data streams which are transmitted to the user modems. Similarly, in the upstream direction, the distribution hub receives multiple relatively small data streams from the user modems. The hub either groups the streams together into one larger stream which is provided to the MHE or sends the smaller data streams back downstream to the home. The routing and grouping of the information is performed by the local switch 206.

Forward error correction circuits (FECs) 203 and 211 provide the mechanism by which transmission errors may be corrected upon receipt by the user modems. This correction device is needed to accommodate the higher probability of transmission errors associated with digital data transmission over a cable network. Each FEC inserts a redundancy code into the data which subsequently enables the receiving user modem to receive the redundancy code and reconstruct bad bits, thereby correcting the transmission errors. Each redundancy code inserted into the data stream is typically associated with a specific length of data.

Each modulator (e.g., 212 and 201) may be, for example, a 27 MB/s quadrature amplitude modification (QAM) modulator as is known in the art. Similarly, each demodulator (e.g., 202,213) is a quadrature phase shift keying (QPSK) demodulator that demodulates the tuned to upstream radio frequency signal and outputs a signal at baseband. The demodulator also includes error correction based on algorithms used by the cable modem. If the security algorithm implemented is for the last hop, the decryption algorithm is also performed in the demodulator.

The link access control (LAC) circuit 204 gathers statistics as to how much data each user sharing the facilities is transmitting. The LAC circuit 204 also limits the usage of users to what they are paying for and denies users access when they demand too much data transmission capacity. The LAC 204 also monitors usage statistics and provides this information regarding the status of the upstream transmission link to the downstream link via its link into the modulators (e.g., 201). This feedback information is-sent back to the local switch 207 for transmission to the MHE.

The feedback link from the link access control 204 to the 64 QAM modulator 201 is important to the present invention. It informs exactly which network access devices have authorization to transmit and which do not. It is through the scheduling algorithms of the link access controller 204 that the network access devices achieve the level of performance for the level of service authorized them. The answer to the questions which network access devices are allowed to transmit over a shared channel is answered here. The problem is that each device may request multiple services and each of these may be at different peak bit rates depending on the different services requested. For example, one type of these multiple service types can be for computer data known as Available Bit Rate services (ABR) where a service provider guarantees some minimum and maximum of available bit rate. Another type of such services is Continuous Bit Rate (CBR) (the peak and average bandwidth are identical, for example, for voice communications). Another type is Uncommitted Bit Rate (UBR) (the system will do what it can to provide what it can, for example, Internet protocol or IP). Another example of such a service type is Variable Bit Rate (VBR) (periodic over time, for a given instant, a different information rate, for example, compressed video). Note that UBR and ABR services can fill in the bandwidth gaps in a shared digital data communications channel between the subscriber and the headend. Other types of services having different bit rate demands and quality of service requirements in accordance with the present invention will probably evolve over time and the invention should not be deemed to be limited to the above-listed types of services alone.

Figure 4:
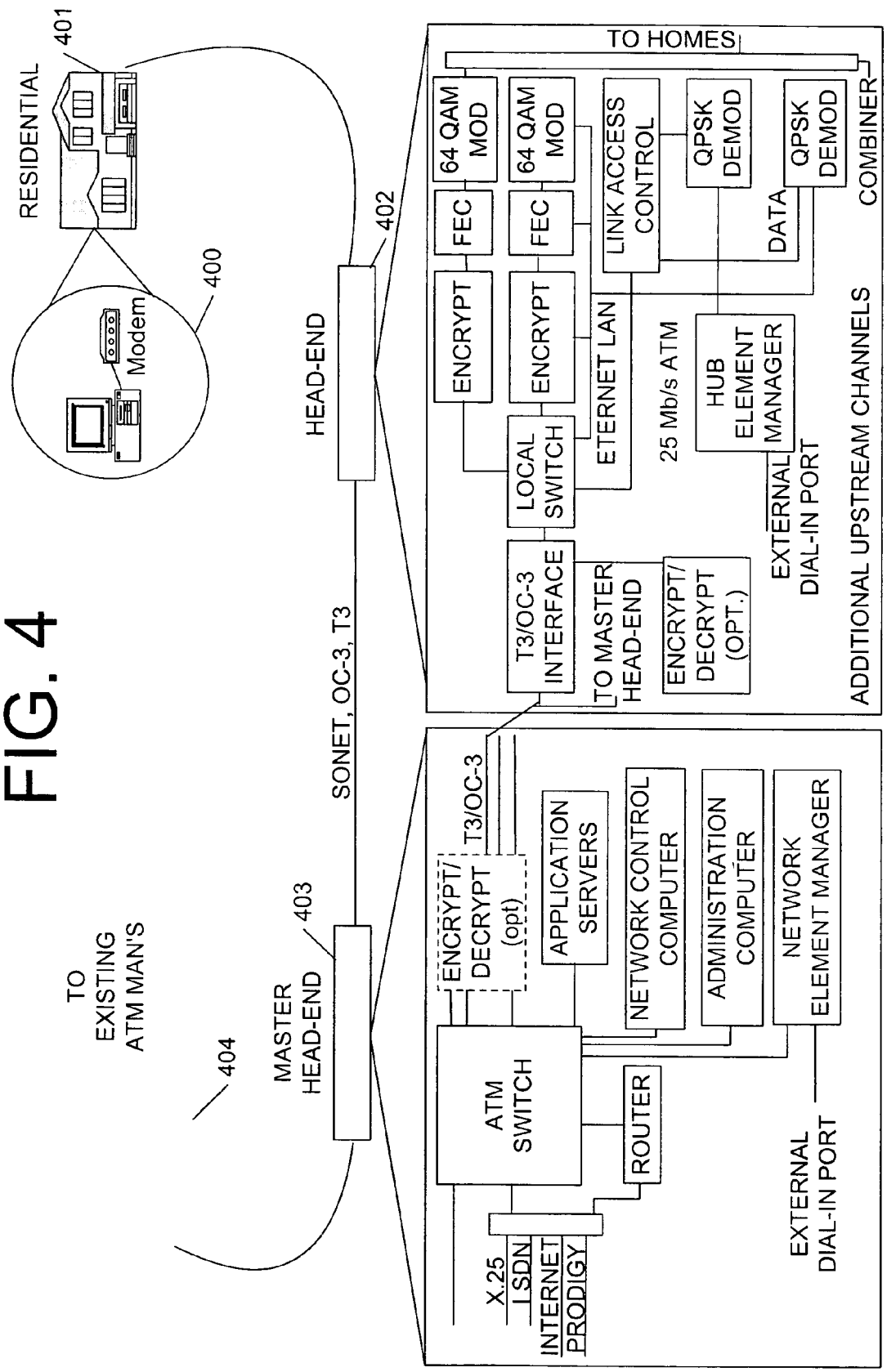
FIG. 4 provides a block diagram of a user modem initialization sequence within a cable data network according to the present invention.

The hub element manager 209 performs network management functions supplemental to those performed by the network element manager 106 of the MHE. For example, the hub element manager 209 monitors the status of the network, for example, the QAM downstream modulators and upstream QPSK demodulators and periodically polls active modems to determine how many errors each modem is experiencing. Polling also discovers active modems that have demanded service. When, for example, a predetermined level of error rate is detected and normal paths of communication between the network and hub element managers is broken, the network element manager 106 of the MHE calls in the hub element manager 209 via the depicted dial-in port such that communication between the hub element manager 209 and the network element manager 106 is not dependent upon the cable data network (FIG. 4 provides a network overview showing the normal communication path between hub and network element managers and the dial-in port communication path used when the normal path is broken).

A local area network (LAN), for example, an Ethernet LAN, is used to enable communications between the hub components 201, 202, 203, 204, 205 and 206 to allow the hub element manager 209 to detect any problems within the distribution hub itself.

Upstream data received at, for example, 1.5 Mb/sec from the user modems is transmitted from the demodulators 202, 213 via the link access controller 204 to the local switch 206. The link between the link access controller 204 and the switch 206, for example, is a 25 Mb/s ATM link. The local switch then directs the data upstream or downstream as needed. Downstream traffic flows via elements 205, 203, 201 (210, 211, 212).

Link Access Controller 204

Figure 2A:
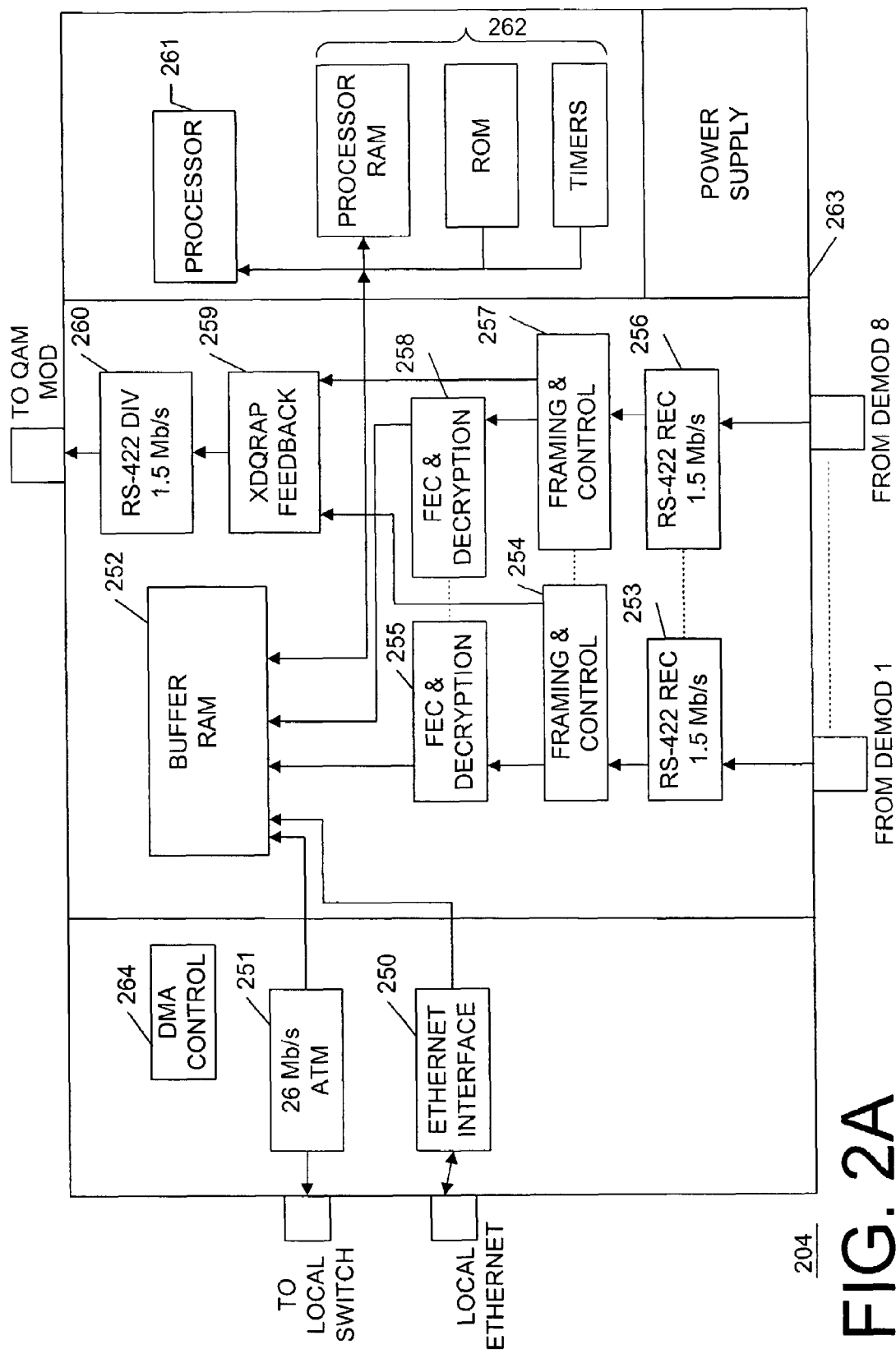
FIG. 2A provides a block diagram of a link access control circuit 204 for use in the distribution hub of FIG. 2.

A link access control circuit 204 for use in the distribution hub of FIG. 2 is shown in greater detail in FIG. 2A. The primary tasks for the Link Access Control may include:

1) Receiving requests to use an upstream channel.
2) Transmitting immediate feedback for the upstream channel request and dataslot status to the QAM modulator for downstream transmission to the sending modems. If a modem is exceeding its allotted bandwidth, the request will be rejected.
3) Receiving upstream data, for example, obtaining the ATM cell from the data portion of the upstream channel, if the data is FEC protected, then it corrects the data using the attached FEC and performs a decryption function if the upstream security is enabled.
4) Providing and scheduling data grants to network access devices depending on the type of connection that is initiated by the network access device. This metering or regulation of the upstream traffic from the network access device is required to both police the upstream traffic and to ensure that large bursts of data do not adversely effect the rest of the network.
5) Transmitting the data from the link access controller to the local switch.
6) Maintaining statistics about each connection. At the end of each connection, the information is forwarded to the Administration Computer for storage.

Types of parametric statistics to be collected include, but are not limited to, the following:

Bandwidth of connection;
Length of connection;
Total amount of data transmitted, (for example, in an ATM network, a total number of cells);
Bit error rate;
Source and destination addresses;
Start time of connection; and
Amount of data rejected because they were in excess of requested bandwidth.

The data grant involves a scheduling algorithm for scheduling and controlling the flow of data upstream operative in real time at the link access controller. In particular, tasks 2 and 4 are related to the type of service being provided to the user, sharing the network with other users. This data grant needs to provide feedback to the modem as immediately as possible after a data transmission request and comprises authorization to transmit a number of cells at a given point in time at a given bit rate (and so within a given level of service).

The link access controller 204 has several primary input/outputs: an Ethernet interface port, a port to the local switch, an upstream data port coupled to a plurality of demodulators and a downstream port to a QAM modulator. A local Ethernet interface 250 provides the ability to load information into the LAC circuit 204 from the hub element manager 209 to determine which users are authorized and the level of performance authorized for each user as well as the health of connections (dedicated port, local Ethernet port 250, ATM port 251, QAM modulator port 260).

Each upstream channel coming from the demodulators (e.g., 202, 213) is processed by a corresponding serial chain of circuits 253, 254, 255 or 256,257,258. The upstream digital data is first received from a demodulator at a corresponding RS-422 receiver 253, 256. The data is reassembled by framing and control circuits 254,257 to establish proper framing and reassemble ATM cells. FEC and decryption circuits 255 and 258 correct insufficient data transfer as much as possible and decrypt received information using each individual user's decryption key.

The LAC circuit 204 may be coupled by a dedicated link to each upstream demodulator. The LAC circuit 204 may handle multiple units, for example, 8 demodulator units for each upstream channel. The requisite feedback information to tell the modems the status of their upstream transmission may be sent via port 260 to a downstream quadrature amplitude modulation (QAM) circuit where it is multiplexed into the downstream traffic. The aggregated upstream data traffic may be sent via a dedicated 25 Mb/s ATM link 251, back into the local switch for relay to the downstream modulator or the ATM switch in the Master Head-End depending on its specified destination.

A buffer random access memory 252 is provided for temporary data storage. Information received by the LAC circuit 204 is stored directly in the buffer memory 252 without intervention of a processor (e.g., 261) using a direct memory access (DMA) controller 264.

Processor 261 is programmed with a scheduling algorithm which enables the processor 261 to control the amount of information transmitted by each of the users. The processor 261 then sends the message via the downstream modulator (e.g., 201, 212) to the user's network access device, either a signal denying or allowing data transmission from the user. For example, if a user tries to exceed its authorized peak transmission bandwidth, it will be notified that the transmissions cannot be sent. If the network access device continues to try, the information will not be forwarded to the local switch, thereby locking out the user's transmissions.

The processor 261 requires a small amount of program memory 262 including processor RAM, read only memory ROM and timers to collect and store necessary processing information and parametric statistics. A power source 263 is also provided.

Modem Design

Figure 3:
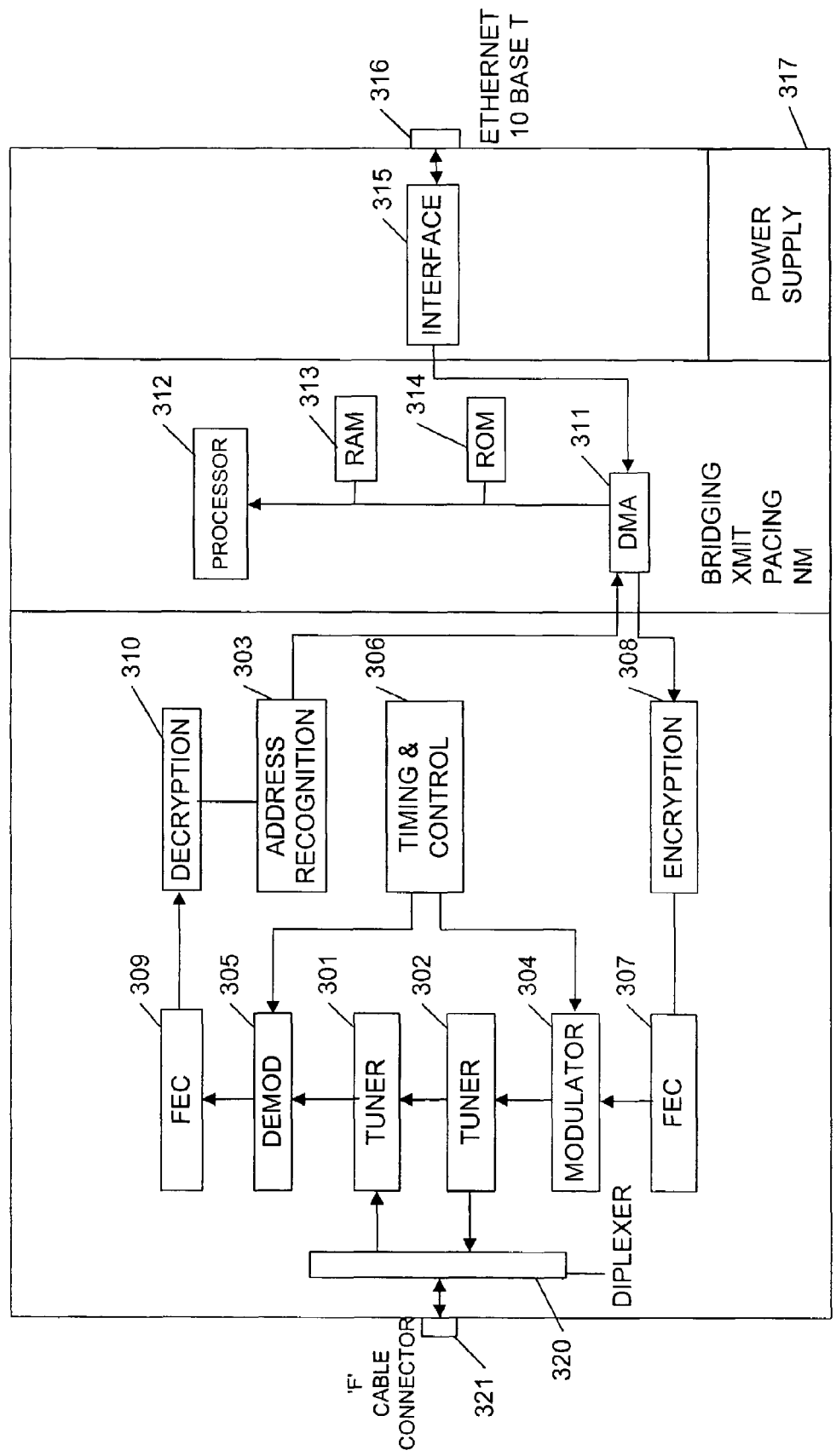
FIG. 3 provides a block diagram of a user modem for use in a cable data network according to the present invention.

One embodiment of a network access device is a cable modem for use in the cable data network architecture according to the present invention is illustrated in FIG. 3.

With reference to FIG. 3, the user network access device or modem is designed to connect to a standard Ethernet 10BaseT interface (a LAN interface) on one side to subscriber apparatus and to the cable network on the other. Each modem has an independent power supply powered by line voltage. The customer premise may have multiple devices including but not limited to personal computers, work stations, intelligent phones, video-conferencing systems, cable television terminals, and other such devices attached to the interface 315; therefore, the modem must perform a standard bridging function of only forwarding packets destined for devices not on its link.

The modem provides separate tuner paths and modulation/demodulation techniques for the upstream and downstream data paths in the cable data network according to the present invention. Each modem includes one or more frequency selectable tuners (e.g., 301, 302) operating, for example, in a 15–28 MHz upstream frequency range and a 150–750 MHz downstream range, a diplexer 320 separating the directions of transmission of the combined signal at connector 321. The modem also includes forward error correction in each direction, encryption/decryption, and an address recognition circuit 303. The modem also comprises an Ethernet connection 316 to the user's computer or other apparatus and Ethernet bridging and ATM mapping circuitry including direct memory access (DMA) control 311, a processor 312, and accompanying random access memory 313 and read-only memory (ROM) 314 devices.

Data transmission in the upstream direction is a multi-point (all user modems) to point (a single distribution hub or the MHE); that is, all information from each user modem is transmitted to a single location. To accomplish this, transmissions from each user modem must be coordinated in some fashion. The timing and control circuits 306 of each user modem assist in performing this function by controlling when each modem transmits upstream to a LAC 204 connected to it, in other words, by telling individual modems when to transmit and when not to transit so connected modems can share the cable network. Thus, the timing and control circuits 306 in all of the user modems on the network work together under control of their respective processor 312 and respond to grants from LAC 204 to coordinate upstream data transmission functions. This function as a whole is called Media Access Control or MAC.

Another function of the timing and control circuit 306 is bit synchronization and the like. The timing and control circuit 306 is applied to obtain bit synchronization and provides framing of actual data received by modem. By framing received data, the timing and control circuit participates in differentiating control information from actual data. Tinning and MAC operate at two different layers in the OSI model the physical layer for timing and MAC at a control layer. Additional details regarding one MAC format, known as extended DQRAP or XDQRAP are provided in U.S. Pat. No. 5,390,181, issued on Feb. 14, 1995 and "extended DQRAP (XDQRAP): A Cable TV Protocol Functioning as a Distributed Switch," by G. Campbell and C. Wu, published by the Computer Science Department of the Illinois Institute of Technology in Chicago, Ill. and dated Jun. 24, 1994, both incorporated herein by reference.

The modem processor 312 assists in providing pacing/spacing of transmissions and thus quality of service for each connection and also participates in media access control. Modulator 304 may perform, for example, at 1.5 Mb/s QPSK modulation in a 1 MHz bandwidth. Demodulator 305 may perform, for example, 64 or 256 QAM demodulation in a 6 MHz downstream channel. The processor records any parametric statistics in random access memory 313.

The downstream path includes a tuner 301, a demodulator 305, an FEC circuit 309, a decryption circuit 310 and an address recognition circuit 303. The FEC circuit 309 tries to correct received data according to well-known algorithms. The address recognition circuit 303 screens data to determine which data is destined for this modem or for another modem in the network to ensure that only data with addresses corresponding to this modem are received.

The upstream path includes an encryption circuit 308, a FEC circuit 307, a modulator 304 and a tuner 302. The forward error correction circuit applies forward error correction according to the modem algorithm for doing so.

As represented by functional block 311, the user modem has direct memory access which enables the received data via the downstream channel to be stored directly in the RAM 313 without the intervention of the processor 312. Processor 312 then determines the destination of the received information in the Ethernet LAN and whether to alter the format of the information based upon its destination. Thus processor 312 may perform several alternative functions on received data. For example, processor 312 determines whether the received information is to be sent out to a personal computer (PC) or other device via the LAN (e.g., an Ethernet 10BaseT LAN 316) via interface 315 (e.g., a standard RJ-45 or RJ-11 Ethernet interface chip which converts Ethernet protocols into bytes which can be stored in the RAM 313). Received cells may be reassembled into IP packets or control data identified and processed locally. Processor 312 may also determine whether the received cells require reassembly from a variable length Ethernet packet format to an ATM packet (48 bytes). If packet assembly is required for upstream transmission onto the cable network via diplexer 320 and cable connector 321, the processor 312 takes the data packets and segments them into ATM cells and adds control data including the correct header.

Since each box containing the user's modem appears to the user's PC as a transparent bridge, some customers may wish to have software to monitor the health and status of the bridge. Where possible, status information such as transmit error bit rate, receive error bit rate, packets sent and throughput may be provided over the 802.3 interface 815.

Data Flow within the Network Architecture

Modem Initialization Procedures

Figure 5:
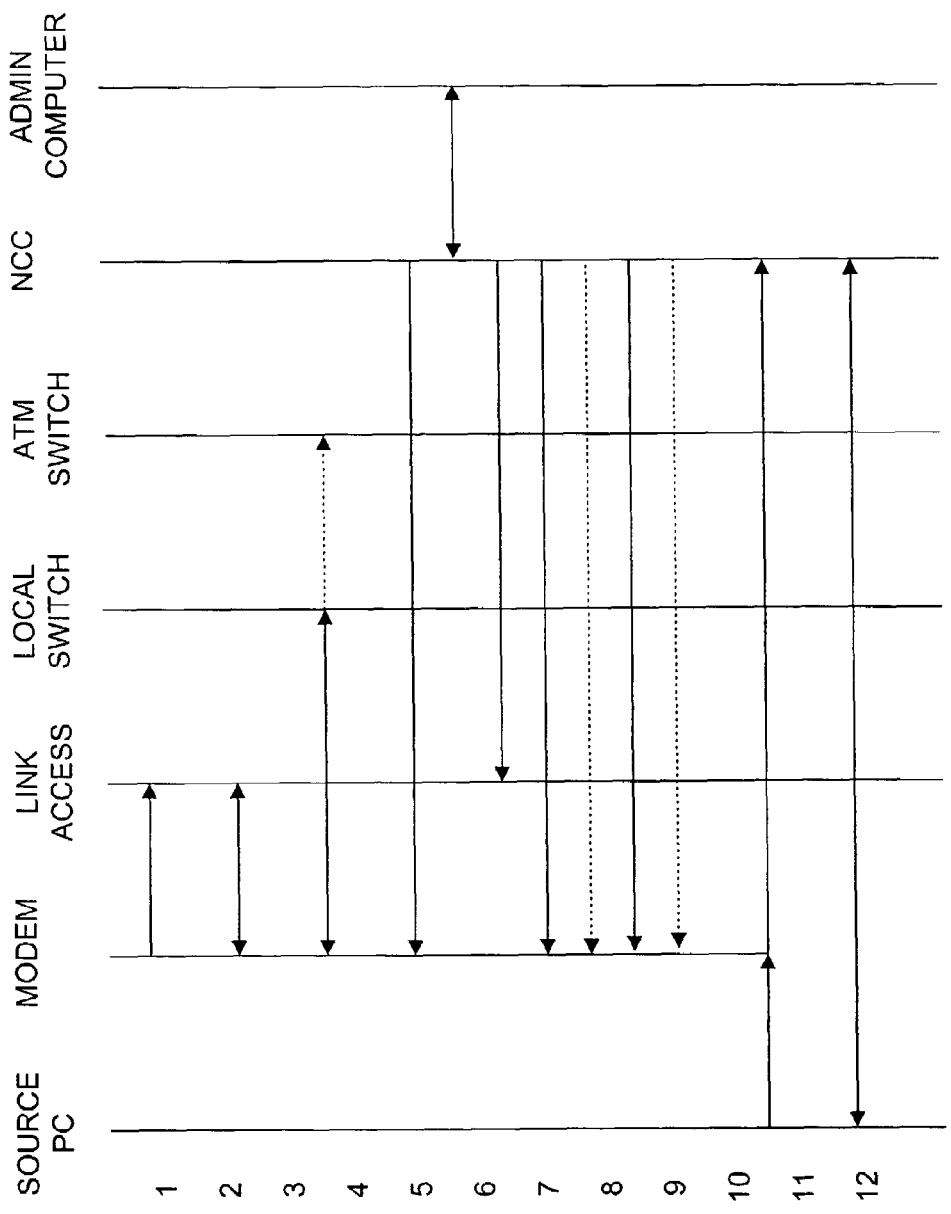
FIG. 5 provides a diagram illustrating a user modem initiation sequence within the cable data network of FIG. 4.

FIGS. 4 and 5 illustrate a modem initialization process for each user modem in the network architecture according to the present invention. When a user modem is turned on, it needs to understand the working environment so that it can participate non-disruptively with the existing users. The modem will power-up in a listen-only mode until it can find a downstream channel that conveys the information on how to begin upstream transmission. A detailed explanation of these procedures is provided in parent U.S. application Ser. No. 08/627,062 filed Apr. 3, 1996 and is incorporated herein by reference in order to promote brevity of disclosure of the present invention.

Connection Set-Up Procedures

Figure 6:
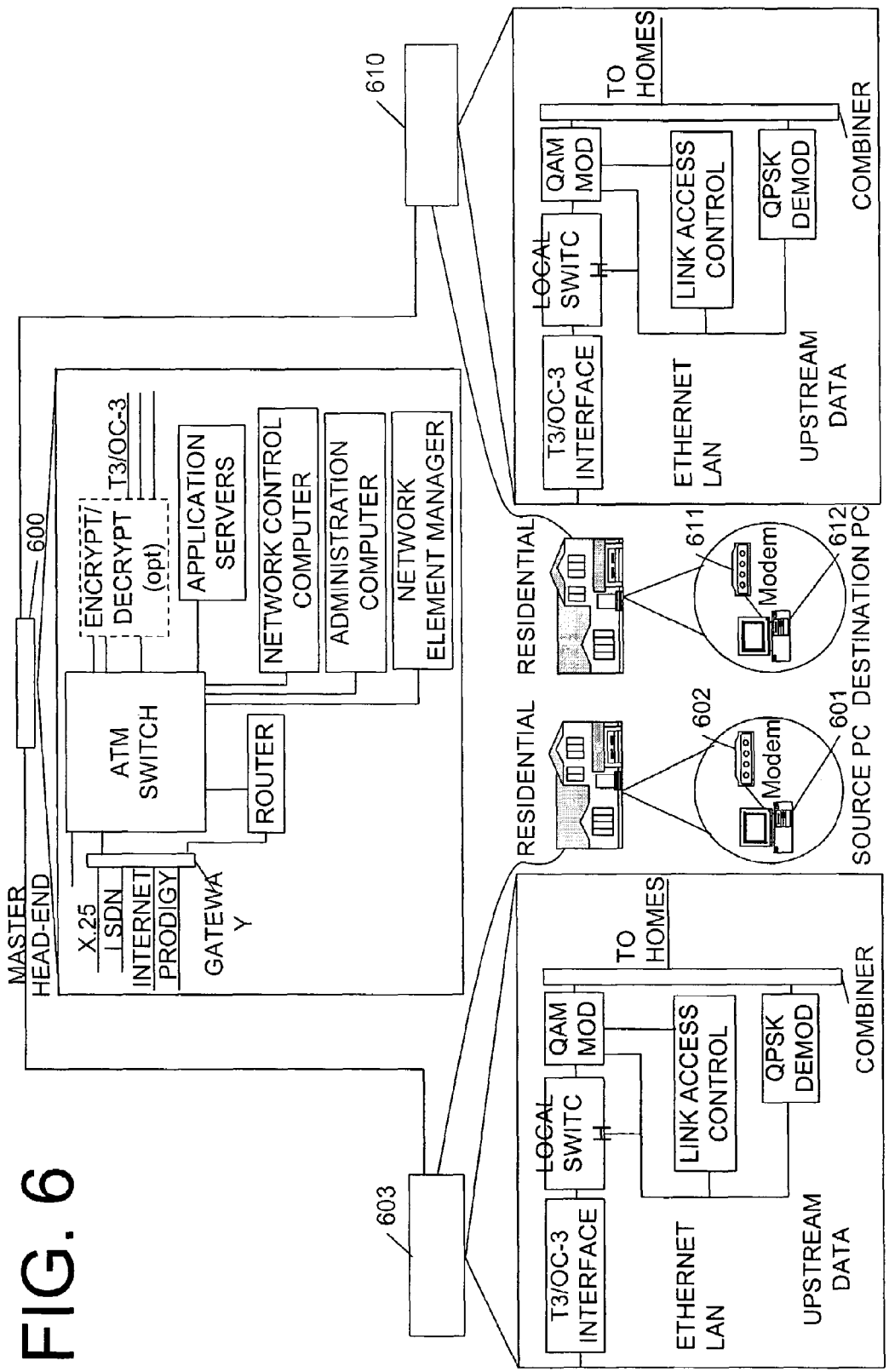
FIG. 6 provides a block diagram of a connection setup procedure in the cable data network according to the present invention.
Figure 7:
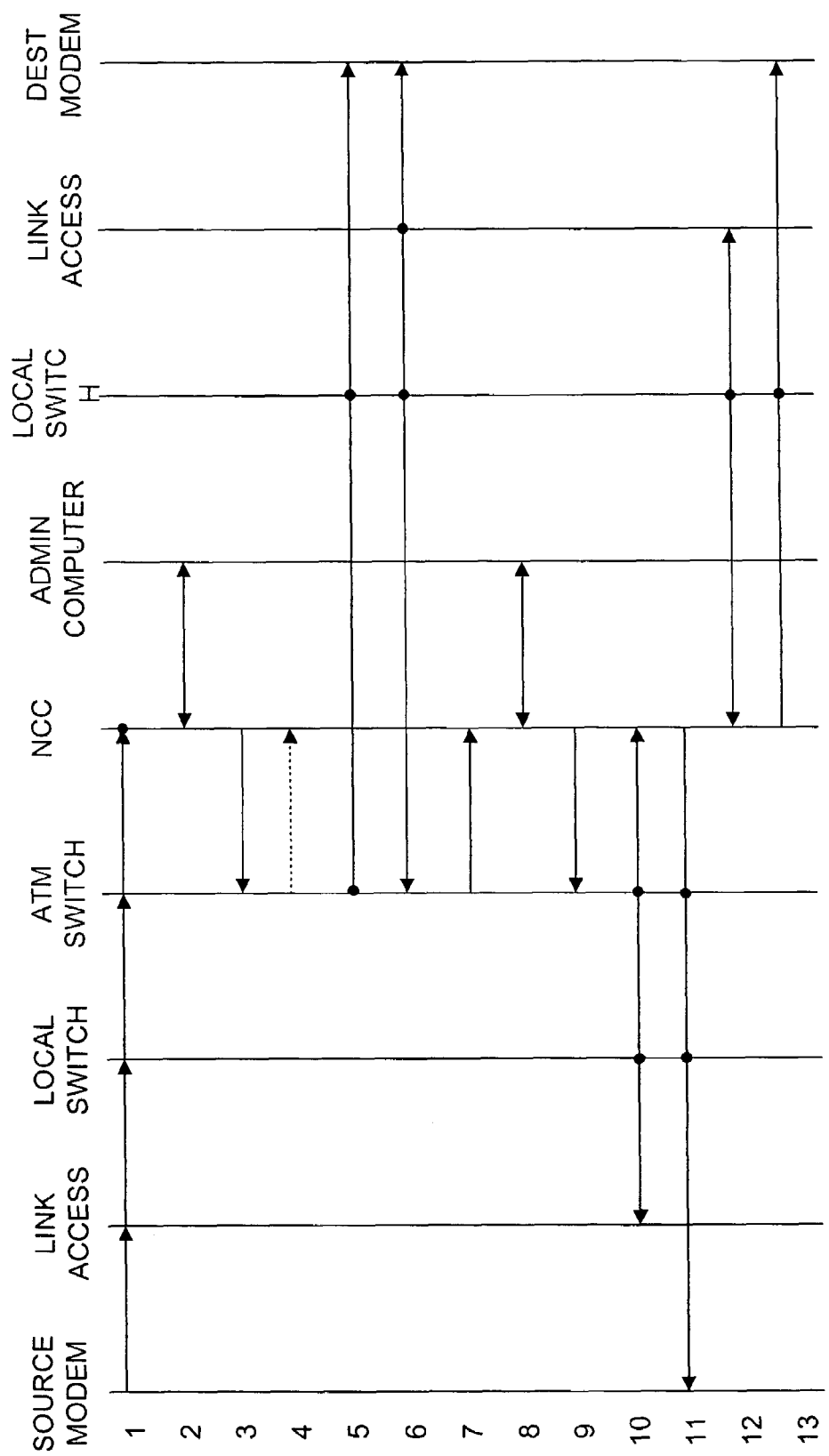
FIG. 7 provides a diagram illustrating the connection setup sequence within the cable data network of FIG. 6.

A connection setup procedure in the cable data network according to the present invention may be based, for example, on the ITU Q.2931 standard. FIGS. 6 and 7 illustrate one possible connection initialization sequence. For purposes of this example, it is assumed that the source and destination personal computers (PC's) are located on separate distribution hubs within the same system. The source has already determined the destination address before starting the connection.

FIG. 6 provides the physical layout of the network, including a source PC 601, a first residential modem 602, a first distribution hub 603, an MHE 600, a second distribution hub 610, a second residential modem 611, and a destination PC 612.

FIG. 7 illustrates the messages that are sent between the different blocks to initialize a connection between the source PC 601 and the destination PC 612. Connection setup is achieved through the following steps:

1. Source PC 601 may use Q.2931 set-up procedures to setup an ATM connection. The ATM switch receives the signaling message and passes it to the NCC.
2. The NCC confirms calling party's authorization, level of services, etc., from the administration computer. Communications between the NCC and the administration computer are required. The NCC also allocates the bandwidth required to provide the connection for the source cable modem. If the bandwidth on either the reverse channel or the forward channel is not available, a new frequency assignment is required. Such frequency agility may or may not cause a station to move to a different port with respect to the ATM switch.
3. The setup message is then sent back to the ATM network connection control management entity to setup a connection between the source and the destination modem.
4. The ATM switch proceeds with the connection set-up process.
5. The ATM switch forwards the connection set-up request to the destination modem.
6. The ATM switch receives the connection-accept message from the destination modem.
7. Once the ATM switch receives connection-accept message from the called party, it passes the information to NCC.
8. The NCC allocates the up/down channel capacity for the called party's bandwidth and confirms the called party's authorization from the administration computer.
9. The NCC informs the ATM switch that the connection has been accepted.
10. The NCC confirms that connection set-up to the source modem.
11. The NCC informs the source link access control to allocate bandwidth.
12. The NCC confirms the connection to the destination modem.
13. The NCC informs the destination link access controller to allocate bandwidth.

Data Interchange within the Network

Figure 8:
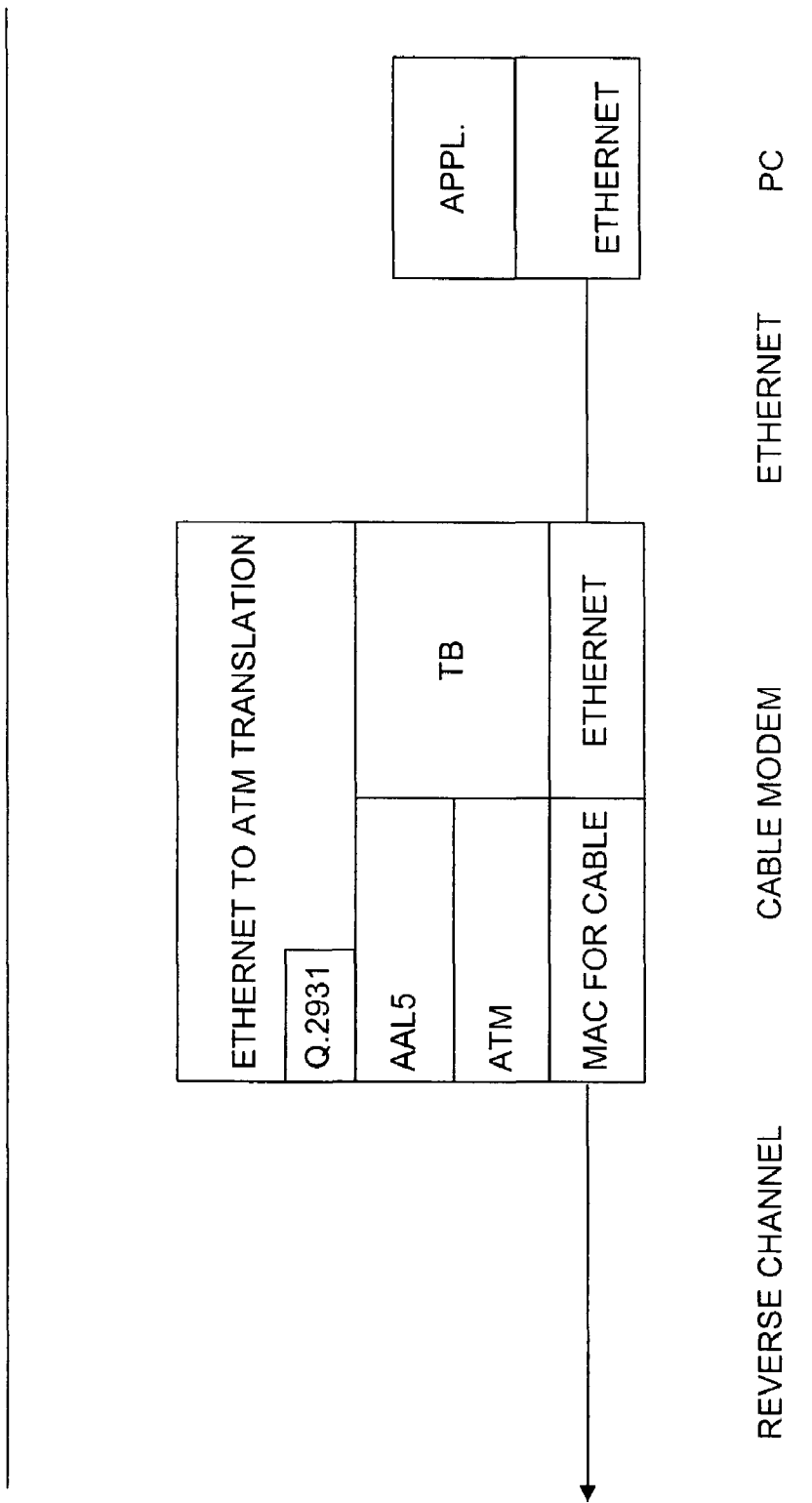
FIG. 8 provides a diagram illustrating a protocol stack at a source modem in a cable data network according to the present invention.
Figure 9:
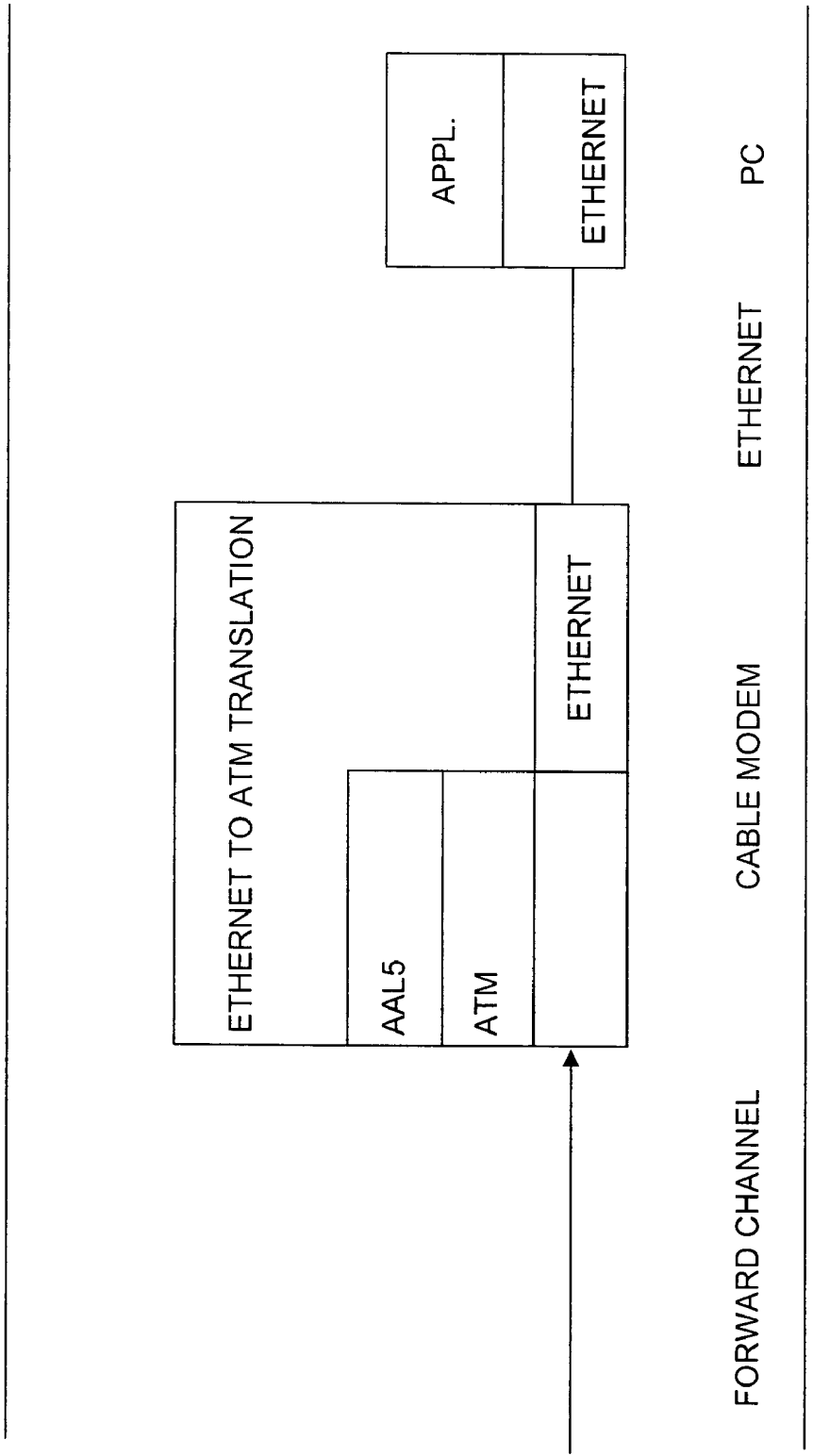
FIG. 9 provides a diagram of a protocol stack at a destination modem in a cable data network according to the present invention.
Figure 10:
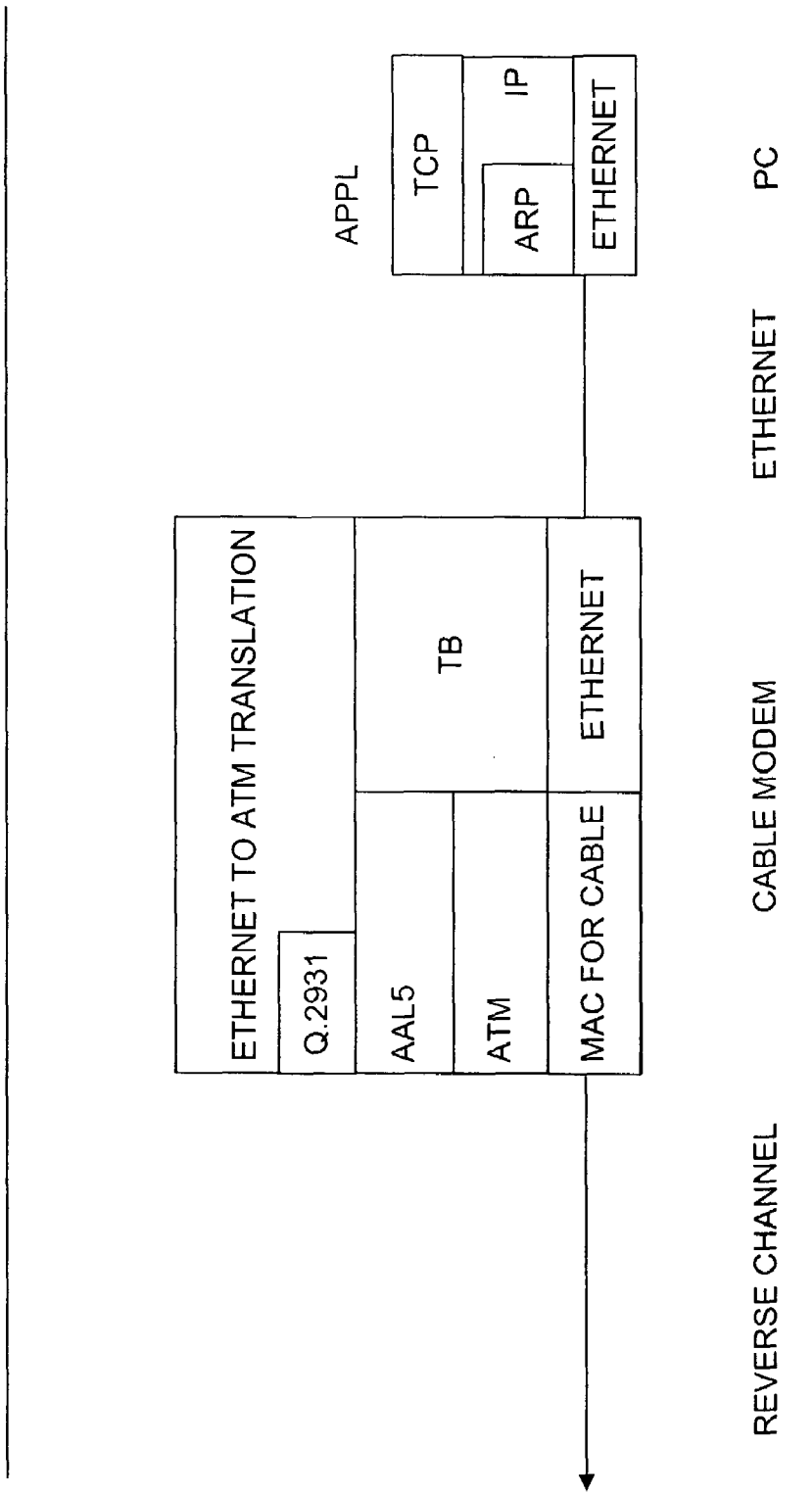
FIG. 10 provides a diagram of a protocol stack involving IP routing.
Figure 11:
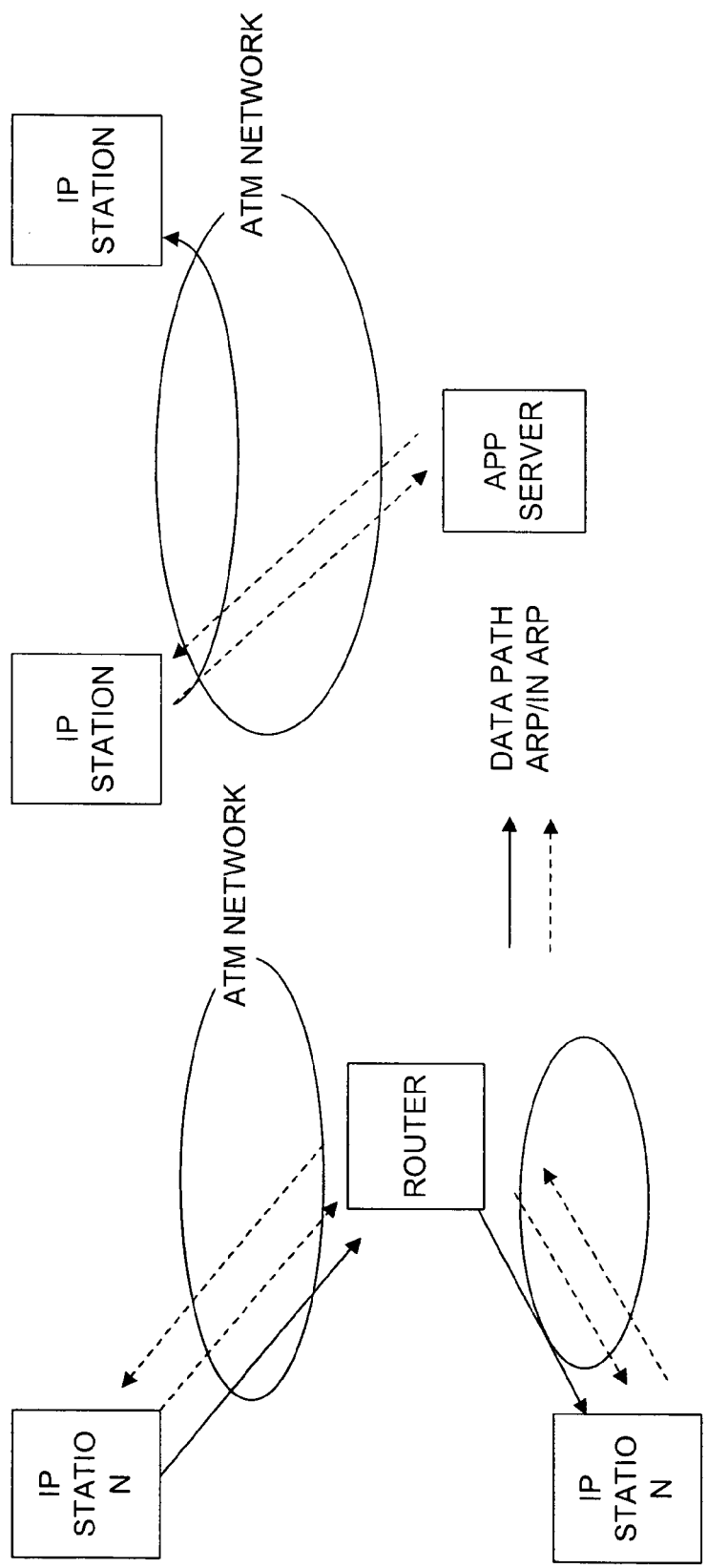
FIG. 11 provides a diagram of the data flow of IP traffic based on an RFC1577 model.

Some examples of data interchange within the network architecture are described with reference to FIGS. 8–11 in parent U.S. application Ser. No. 08/627,062, filed Apr. 3, 1996, and the detailed description is omitted here to promote brevity of the present application. FIG. 8 provides a diagram of a protocol stack at the source modem. FIG. 9 provides a diagram of a protocol stack at a destination modem. FIG. 10 provides a diagram of a protocol stack involving IP routing. FIGS. 8, 9 and 10 are based on the OSI seven-layer model for communications protocols and illustrate three of the seven layers. FIG. 11 provides a diagram of the data flow of IP traffic based on an RFC1577 model.

Figure 12:
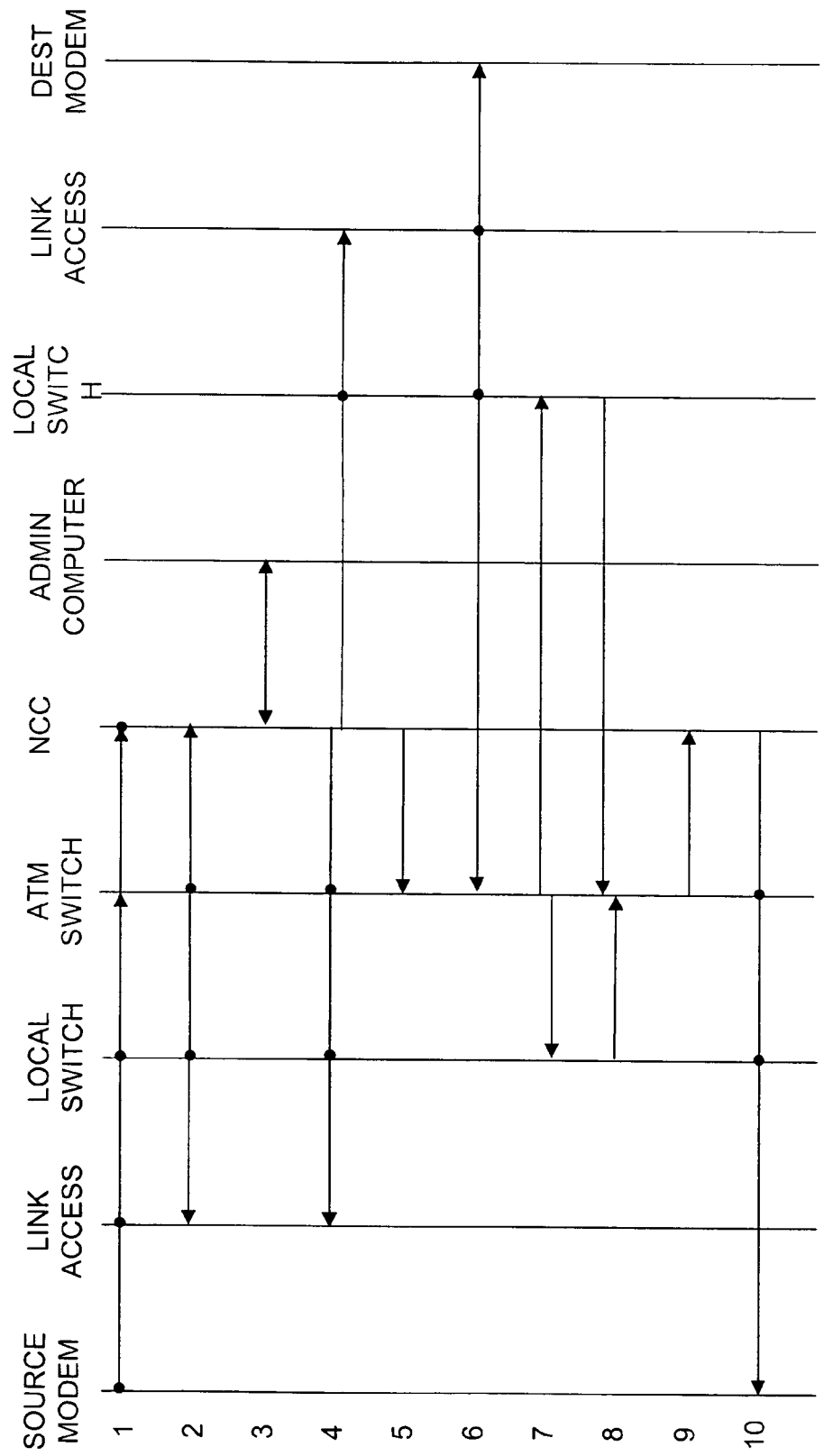
FIG. 12 provides a diagram illustrating a disconnect sequence in the cable data network according to the present invention.

With reference to FIG. 12, in the cable data network architecture according to the present invention, a network connection must eventually be disconnected so that network resources can be reclaimed. In a LAN environment, there is no explicit disconnect sequence that can be used to indicate that additional communications to that destination will no longer be required. For this reason the modem makes intelligent choices as to when to terminate a session.

Two events are likely to trigger the need to disconnect an existing connection. After some period of time a connection can be aged out based on a loadable timer. Since a new connection can be established later if needed again, little is to be lost by dropping a non-performing connection. Another reason to disconnect a connection is that a new connection to a different destination was attempted but the connection request was denied because there was insufficient bandwidth available to support the new connection. In this event, the modem may wish to select the connection that has had the least amount of activity and drop that connection and then attempt to restart the failed connection.

The modem will attempt to terminate a connection when either an elapsed time has passed without activity or there was a request for additional bandwidth that could not be granted. The modem sends a Disconnect Request (via Q.2931) message to the NCC.

The NCC then retrieves statistics associated with this session from Link Access Control and passes the statistics to Administration Computer. The NCC also tells the source and destination Link Access Control to disconnect the session and tells the ATM switch to Disconnect (via Q.2931) the session. The ATM switch tells the Destination Modem to disconnect the session and tells the local ATM switches to disconnect the session. The local ATM switches confirm that they have disconnected the session. Finally, the ATM switch confirms to the NCC that the connection has been disconnected, and the NCC confirms modems request to Disconnect.

Messaging between the NCC and the ATM Switch is performed such that the NCC receives Q.2931 messages usually destined to ATM connection control manger, the NCC informs the ATM switch to setup a connection with a calling party address other than the NCC, and the ATM switch signals the completion of the call-setup procedure.

In order to perform these functions, the NCC is aware of the internal ATM switch architecture and protocol which is vendor dependent.

For messaging between the NCC and the Administration Computer, a communication channel is required if the NCC functions and administration functions are carried out by different computers. Messaging may be accomplished by connecting the applications on the NCC and the Administration computers by an ATM PVC or SVC. The applications on the NCC and the Administration computer may also communicate through the TCP/IP with or without ATM connections as the underlying transport mechanism.

This communication channel enables the NCC to utilize the database maintained by the administration computer for service authorization. Additionally, this channel enables the Administration computer to inform the NCC the results of the authorization screening. Also, the channel enables the NCC to provide the administration computer the user usage statistics for billing purposes.

Media Access Control

In the cable data network according to the present invention, users transmit information in the upstream channel toward the headend and receive information from the downstream channel. A number of different mechanisms are available to control access to the upstream link by multiple users simultaneously while preventing collisions within the network. Several methods are under consideration by various groups and standards organizations including the IEEE (802.14), DAVIC and CableLabs. The parametric statistic gathering techniques and flexible tiered billing of the present invention may be applied equally in any such method of media access control.

Summary

In operation and to summarize the discussion of FIGS. 1–12, when a subscriber registers with an operator of a network according to FIG. 1, a unit number, such as a unique serial number, of a network access device, such as a cable modem, is entered into a database residing in the administration computer 105. At that time and at subsequent service reauthorizations to different levels of service, the subscriber chooses a different maximum boundary for desired services represented, for example, in parameters of maximum or peak bit rate or bandwidth. The quality of service at a particular subscribed-to level of service can be measured by actual data throughput during a session. The main points of control for a level of service are peak bandwidth and delay (for example, end-to-end delay) or jitter which influence data throughput. The system tries to find a route that will be provided service within the maximum delay and, if it cannot, will deny service on that route and try to find another route.

Jitter is defined as the variation in arrival times between data packets. Associated therewith will be a maximum delay respectively. Other associated parameters may include, response time, access time, connect time, delivery time, delay to service receipt or delay between audio communications in an asynchronous duplex connection and the like. The commitment by the service provider represents a minimum guarantee to the subscriber that the network will provide that subscribed-to level of service and, upon request, the service provider will be able to prove that the subscribed-to level of service was indeed provided. From a service provider's perspective, then, the commitment to a level of service represents a maximum level of service to the subscriber. The subscriber may use less bandwidth or a lower data rate at any time but should receive at worst the level of service paid for in regard to all parameters of that level of service. On the other hand, if a level of service is provided above a subscribed to level of service, that is a subscriber is in fact able to receive more bandwidth or higher bit rate than the maximum subscribed to, the system operator loses the opportunity to charge more for the expanded level of service.

For example, a subscriber requests a level of service of 256 kilobits per second bit rate maximum be provided at their cable modem. If the subscriber tries to run an application demanding that level of service from the network and the network fails in delivering that level of service, the subscriber can and should dispute the money they pay to the operator for the service. The operator should be able to show that that level of service was in fact provided when that application demanded its use. Also, when a 64 kilobit per second application is requested and the level of service is at 256 kilobits per second, the cable modem should run smoothly, because the bit rate requested is less than the subscribed-to level of service.

The reverse of this example is a standard Ethernet network where a user can seize a link and use all available bandwidth. If the operator does not takes steps to prevent the subscriber from, in fact, seizing the entire available bandwidth of the shared channel with other subscribers (assumed to be a greater than a 256 kilobit/sec channel), the operator will suffer a loss because the bandwidth cannot be sold to or used by the other subscribers that can share that channel. These subscribers, denied access by the Ethernet application subscriber, would complain to the system operator about the lack of bandwidth and availability of channel to their network access device, such as a cable modem.

At some point, the subscriber installs their network access device and decides to utilize the full range of products and services offered in accordance with the present invention. The subscriber then contacts the service provider and subscribes to a maximum level of service. Once authorized, the subscriber can then utilize their network access device to obtain service. The network access device signals a desire to establish a connection with another unit or with a service provider coupled to the master headend of FIG. 1A and also sends at least its unique identity. The network control computer 104 (FIG. 1A) receives the request and sends an inquiry to the administration computer 105 to determine the approved level of service for this network access device identified uniquely to it, for example, by serial number during the initial signaling by the network access device. The bit rate request or level of service requested is matched with the maximum service level subscribed-to to see if the latter is greater than or equal to the level of service requested. If the answer is yes, then, an appropriate route through the network is computed at the network control computer 104. If the answer is no, there may be some negotiation between the network access device and the network control computer 104 in the event some compromise may be reached at or below the maximum bit rate or bandwidth level of service requested, otherwise, the request for service is denied. The subscriber may receive a notice that they must subscribe to a higher identified level of service before they can access a link at the requested bit rate.

Once an appropriate link or set of links through the network is computed that can guarantee the subscribed-to service level or level requested whichever is the lesser, an acknowledgment is forwarded by the network control computer 104 to the subscriber's network access device that service may commence. In addition, a message is transmitted to link access control 204 (FIG. 2) to, for example, record time of day, and initiate a monitoring of service provided to the service originating subscriber. Also, through the depicted feedback link, link access control assures that other subscribers are not able to use the bandwidth temporarily reserved for the demanding subscriber.

In the event that the network access device is denied connection to certain services, a message is returned to the network access device indicating a reject. Since a path through the network has not been reserved, the network access device will be unable to send or receive information. An example of such a service might be connection to the Internet, adult entertainment, access to network CD-ROM's or other unique services.

The link access control 204 (FIG. 2) monitors the flow of information from the network access device. The link access control 204 collects statistics associated with upstream communication. Bandwidth, bit error rates in the downstream direction, data transmitted and received, data discarded, connect time, time of day, delay, jitter, requesting subscriber address, destination address, and upstream duration are collected at link access control 204. Instead of directly monitoring traffic to a particular subscriber's network access device, the link access control 204 is shared by other network access devices of the distribution hub and data is generally collected and stored for all coupled network access devices. When two network access devices are connected via different distribution hubs, the link access control 204 can be assumed to monitor the upstream, source or service originating communications channel as each device will be a source or originator of its own upstream data.

X140, Q.931 for frame relay, RSVP for TCP/IP, Q.2931 for ATM, all as described above, are examples of protocols for establishing connections to a network access device. Each network access device may have, for example, an ongoing video conference at the same time as an Internet connection ongoing. The network control computer 104 needs this information to authorize or deny the establishment of a connection. In summary, policing of the shared upstream channels of the network resides in link access control and overall network control in the network computer.

The link access controller 204 polices the network communications as follows. If the network access device attempts to send information at a rate exceeding its allowed level link access control 204 temporarily denies and delays forwarding the information until the level of service is checked as described above. If the amount of information to be transmitted over time continues to exceed the ability of the link access controller 204 to delay the transfer, the information from the network access device will be discarded and not forwarded.

When the connection is terminated, network control computer 104 requests the link access controller 204 to forward statistical data related to the parameters collected about a communication connection for the source and destination network access devices or gateway services. The network control computer 104 forwards these statistics to the administration computer 105 which stores the information for future reference (for billing or subscriber service verification or other purposes).

For example, on a periodic basis, the administration computer 105 may generate subscriber bills that utilize the connection information to charge for the amount of network resources actually used during the preceding billing period. In the event of a dispute of the charges, the administration computer 105 is able to retrieve and provide the statistics associated with any connections established during the billing period.

The above described embodiments should be deemed to be described by way of example only. Other embodiments may come to mind of one skilled in the art such as other modulation schemes, protocols, bit rates, services and the like than those described. These and other features of the present invention should only be deemed to be limited by the scope of the claims that follow. Any United States patent applications or patents referenced herein should be deemed incorporated by reference as to their entire contents, for example, to explain the operation of known components of the present invention.

What is claimed is:

1. A system comprising:
a network control computer configured to:
receive a request for service at an identified bit rate from an identified network access device, the request for service comprising at least a maximum bandwidth or data bit rate over an upstream channel shared by at least one other network access device;

allocate a maximum bandwidth or data bit rate for an authorized level of service for the identified network access device;

compare the authorized level of service with the identified bit rate; and compute a route for a communication from the identified network access device if the authorized level of service exceeds or is equivalent to the identified bit rate.

2. The system of claim 1, further comprising:
a link access controller for issuing a data grant to the identified network access device.

3. The system of claim 2, wherein the data grant issued by the link access controller comprises:
a time of day;
a number of cells; and
an authorized data rate for transmission of the number of cells.

4. The system of claim 2 wherein the link access controller is further configured to store parametric statistics related to the authorized level of service.

5. The system of claim 4, wherein the parametric statistics comprise a bandwidth of the connection of the identified network access device.

6. The system of claim 4, wherein the parametric statistics comprise a start time and a length of connection of the identified network access device.

7. The system of claim 2, wherein the link access controller is further configured to:
police a connection of the identified network access device to assure the authorized level of service for the identified network access device.

8. The system of claim 7, wherein the link access controller is further configured to:
temporarily deny and delay forwarding information from the identified network access device if the identified network access device attempts to send the information at a rate exceeding its authorized level of service.

9. The system of claim 8, wherein the link access controller is further configured such that if the amount of information to be transmitted from the identified network access device exceeds the ability of the link access controller to delay the transfer, the information from the identified network access device.

10. A method comprising:
providing a network access device with an authorized level of service including at least a maximum bandwidth or data bit rate over a shared upstream channel, the upstream channel shared with at least one other network access device; and denying service to the network access device if a requested bandwidth or bit rate by the network access device exceeds a maximum bandwidth or data bit rate of the authorized level of service.

11. The method of claim 10, further comprising:
supervising a connection of the network access device.

12. The method of claim 11, further comprising:
storing connection statistics of the network access device and of the at least one other network access device in a link access controller; and
forwarding the connection statistics to a network control computer.

13. The method of claim 12, wherein the step of forwarding the connection statistics comprises:
forwarding the connection time and the time of connection to the network control computer.

14. The method of claim 12, wherein the step of storing connection statistics comprises storing at least one of:
the source and destination addresses of the network access devices; and
the total amount of data transmitted.

15. The method of claim 11, further comprising:
storing connection statistics of the network access device and the at least one other network access device in a link access controller; and
forwarding at least a portion of the statistics to an administrative computer.

16. The method of claim 10, further comprising:
storing preauthorized level of service data for subscribers; and
communicating the preauthorized level of service data to the link access controller for regulating service at the preauthorized level.

17. The method of claim 16, wherein the step of forwarding at least a portion of the statistics includes:
forwarding statistics representing data for a session of one of the network access devices.

18. The method of claim 10, further comprising:
policing a connection of the network access device to assure the authorized level of service for the identified network access device.

19. The method of claim 18, further comprising:
temporarily denying and delaying forwarding information from the network access device if the network access device attempts to send the information at a rate exceeding its authorized level of service.

20. The method of claim 19, further comprising
discarding the information from the network access device if the amount of information to be transmitted from the network access device exceeds the ability of the link access controller to delay the transfer.

21. A system comprising:
a network control computer for detecting parametric data related to an originated communication from a network access device; and
a link access controller for policing a connection of the network access device to assure an authorized level of service for the network access device, the authorized level of service comprising at least a maximum bandwidth or data bit rate over a shared upstream channel.

22. The system of claim 21, wherein the link access controller is configured to:
temporarily deny and delay forwarding information from the network access device if the network access device attempts to send the information at a rate exceeding its authorized level of service.

23. The system of claim 22, wherein the link access controller is further configured such that if the amount of information to be transmitted from the network access device exceeds the ability of the link access controller to delay the transfer, the information from the network access device is discarded.

24. The system of claim 21, wherein the link access controller is further configured to:
deny service to the network access device if a requested bandwidth or bit rate by the network access device exceeds a maximum bandwidth or data bit rate of the authorized level of service.

25. The system of claim 21, wherein the parametric data comprises a start time and a length of connection of the network access device.

26. The system of claim 21, wherein the parametric data comprises a count of total cells transmitted.

27. The system of claim 21, wherein the link access controller is further configured to transmit data from the link access controller to a local switch.

28. The system of claim 21, wherein the link access controller is further configured to: maintain statistics about the connection, and at the end of the connection, forward at least a portion of the statistics to an administrative computer.

* * * * *